(12) United States Patent
Kamiya

(10) Patent No.: US 11,394,942 B2
(45) Date of Patent: Jul. 19, 2022

(54) VIDEO SIGNAL PROCESSING APPARATUS, VIDEO SIGNAL PROCESSING METHOD, AND IMAGE-CAPTURING APPARATUS

(71) Applicant: SONY CORPORATION, Tokyo (JP)

(72) Inventor: Koji Kamiya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 24 days.

(21) Appl. No.: 16/969,469

(22) PCT Filed: Feb. 4, 2019

(86) PCT No.: PCT/JP2019/003806
§ 371 (c)(1),
(2) Date: Aug. 12, 2020

(87) PCT Pub. No.: WO2019/167555
PCT Pub. Date: Sep. 6, 2019

(65) Prior Publication Data
US 2021/0014466 A1    Jan. 14, 2021

(30) Foreign Application Priority Data

Mar. 2, 2018 (JP) .............................. JP2018-037906

(51) Int. Cl.
*H04N 9/73* (2006.01)
*H04N 9/64* (2006.01)
*H04N 9/69* (2006.01)

(52) U.S. Cl.
CPC ............. *H04N 9/735* (2013.01); *H04N 9/646* (2013.01); *H04N 9/69* (2013.01)

(58) Field of Classification Search
CPC .................................................... H04N 9/735
USPC .................................................... 348/223.1
See application file for complete search history.

(56) References Cited

U.S. PATENT DOCUMENTS

| 2017/0026627 A1 | 1/2017 | Toma et al. |
| 2018/0061026 A1 | 3/2018 | Kozuka et al. |
| 2018/0227561 A1 | 8/2018 | Toma et al. |

FOREIGN PATENT DOCUMENTS

| JP | 2016-197861 A | 11/2016 |
| JP | 2016-225965 A | 12/2016 |
| JP | 2018-7246 A | 1/2018 |
| JP | 2018-14766 A | 1/2018 |
| JP | 2018007246 | * 1/2018 |
| JP | 2018-33164 A | 3/2018 |
| WO | WO 2017/015564 A1 | 1/2017 |
| WO | WO 2017/102606 A1 | 6/2017 |

OTHER PUBLICATIONS

International Search Report dated Apr. 23, 2019 in PCT/JP2019/003806, 2 pages.

* cited by examiner

*Primary Examiner* — Joel W Fosselman
(74) *Attorney, Agent, or Firm* — Oblon, McClelland, Maier & Neustadt, L.L.P.

(57) ABSTRACT

This apparatus includes a first processing circuit section that includes a tone controller that imparts tone curve characteristics for tone adjustment to an input video signal having linear characteristics; and a second processing circuit section that includes a first curve characteristics imparting section that imparts, to the video signal processed by the first processing circuit section, first curve characteristics for output, and generates a first output video signal.

17 Claims, 18 Drawing Sheets

VIDEO SIGNAL PROCESSING APPARATUS, VIDEO SIGNAL PROCESSING METHOD, AND IMAGE-CAPTURING APPARATUS

TECHNICAL FIELD

The present technology relates to a video signal processing apparatus, a video signal processing method, and an image-capturing apparatus that process a video signal generated by an image-capturing section.

BACKGROUND ART

In order to perform adjustment on a signal of a video captured by an image-capturing apparatus such that how an image finally looks (a final tone) is desired by a user, processing of imparting arbitrary curve characteristics for tone adjustment to the video signal is performed, in addition to performing standard gamma processing for, for example, display gamma or optical-electro transfer function (OETF) conversion.

CITATION LIST

Patent Literature

Patent Literature 1: Japanese Patent Application Laid-open No. 2015-154307

DISCLOSURE OF INVENTION

Technical Problem

As described above, processing of imparting arbitrary curve characteristics for tone adjustment to a video signal is performed, in addition to performing standard gamma processing for, for example, display gamma or optical-electro transfer function (OETF) conversion. Thus, signal processing becomes complicated, and it is difficult to perform adjustment such that how an image finally looks (a final tone) is desired by a user.

It is an object of the present technology to provide a video signal processing apparatus, a video signal processing method, and an image-capturing apparatus that make it possible to easily perform signal processing of imparting arbitrary tone curve characteristics for tone adjustment to a video signal, in addition to standard curve characteristics imparted to the video signal.

Solution to Problem

In order to solve the problems described above, a video signal processing apparatus of an embodiment according to the present technology includes a first processing circuit section that includes a tone controller that imparts tone curve characteristics for tone adjustment to an input video signal having linear characteristics; and a second processing circuit section that includes a first curve characteristics imparting section that imparts, to the video signal processed by the first processing circuit section, first curve characteristics for output, and generates a first output video signal.

In the video signal processing apparatus, the second processing circuit section may further include a second curve characteristics imparting section that imparts, to the video signal processed by the first processing circuit section, second curve characteristics for output, and generates a second output video signal.

In the video signal processing apparatus, the first curve characteristics for output may be one of curve characteristics for optical-electro transfer function (OETF) conversion and curve characteristics for display gamma processing, and the second curve characteristics for output may be the other curve characteristics.

In the video signal processing apparatus, the tone controller may generate the tone curve characteristics for tone adjustment using setting information.

In the video signal processing apparatus, the setting information may include a parameter that defines a center of a range of a level of an input signal to which the tone curve characteristics are imparted.

In the video signal processing apparatus, the setting information may include a parameter that defines a range of a level of an input signal to which the tone curve characteristics are imparted.

In the video signal processing apparatus, the setting information may include a parameter that defines a curved shape of the tone curve characteristics.

In the video signal processing apparatus, the setting information may include a parameter that defines an amount of variation in a level of an output signal at a center of a range of a level of an input signal to which the tone curve characteristics are imparted.

In the video signal processing apparatus, the tone controller may generate coefficients for respective color components using the setting information, and may generate the tone curve characteristics using the coefficients for the respective color components and gain adjustment values arbitrarily given for the respective color components.

In the video signal processing apparatus, the tone controller may generate a shared coefficient for a plurality of color components using the setting information, and may generate the tone curve characteristics using the coefficient and gain adjustment values arbitrarily given for the respective color components.

In the video signal processing apparatus, the tone controller may be capable of switching a tone control function to be performed between a first tone control function and a second tone control function, the first tone control function being used to generate coefficients for respective color components using the setting information, and to generate the tone curve characteristics using the coefficients for the respective color components and gain adjustment values arbitrarily given for the respective color components, the second tone control function being used to generate a shared coefficient for a plurality of color components using the setting information, and generates the tone curve characteristics using the coefficient and the gain adjustment values arbitrarily given for the respective color components.

In the video signal processing apparatus, the first processing circuit section may further include a correction-and-color-balance-adjustment section that performs correction and color balance adjustment with respect to a signal generated by an imaging element, and the tone controller may be configured to process, as the input video signal, a signal output by the correction-and-color-balance-adjustment section.

In the video signal processing apparatus, the second processing circuit section may include a matrix processor that performs at least matrix processing on the video signal to which the tone curve characteristics have been imparted, and generates color image data, and a detail-and-knee processor that performs detail processing and knee processing on the generated color image data, and the first curve characteristics imparting section may be configured to impart, to color image data output by the detail-and-knee processor, the curve characteristics for output.

In the video signal processing apparatus, the second processing circuit section may include a first matrix processor that performs at least matrix processing on the video signal to which the tone curve characteristics have been imparted, and generates first color image data of a first resolution, a first detail-and-knee processor that performs detail processing and knee processing on the first color image data, a second matrix processor that performs matrix processing on the video signal to which the tone curve characteristics have been imparted, and generates second color image data of a second resolution, and a second detail-and-knee processor that performs detail processing and knee processing on the generated second color image data; the first curve characteristics imparting section may impart, to the first color image data output by the first detail-and-knee processor, the first curve characteristics for output; and the second curve characteristics imparting section may impart, to the second color image data output by the second detail-and-knee processor, the second curve characteristics for output.

In the video signal processing apparatus, the first color image data may be a high dynamic range (HDR) video, and the second color image data may be a standard dynamic range (SDR) video.

An image-capturing apparatus of another embodiment according to the present technology includes an image-capturing section that generates an input video signal having linear characteristics; a first processing circuit section that includes a tone controller that imparts tone curve characteristics for tone adjustment to the input video signal; and a second processing circuit section that includes a first curve characteristics imparting section that imparts first curve characteristics for output, and generates a first output video signal.

A video signal processing method of another embodiment according to the present technology includes imparting, by a first processing circuit section, tone curve characteristics for tone adjustment to an input video signal having linear characteristics; and imparting, by a second processing circuit section and to the video signal processed by the first processing circuit section, first curve characteristics for output, and generates a first output video signal.

Advantageous Effects of Invention

As described above, the present technology makes it easy to perform adjustment such that how an image finally looks (a final tone) is desired by a user.

MODE(S) FOR CARRYING OUT THE INVENTION

Embodiments according to the present technology are described below.

First Embodiment

Figure 1:
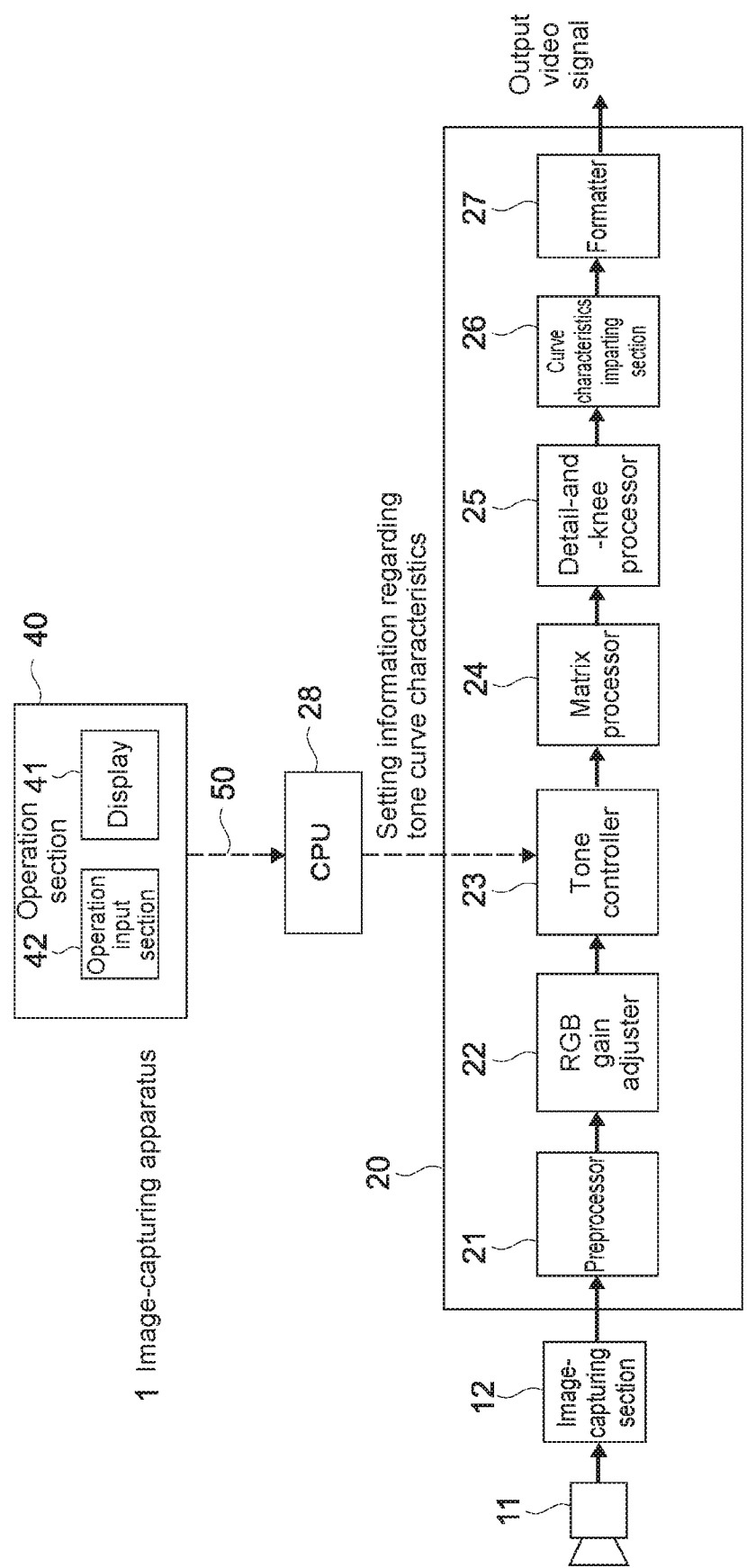
FIG. 1 is a block diagram illustrating a configuration of an image-capturing apparatus 1 of a first embodiment according to the present technology.

FIG. 1 is a block diagram illustrating a configuration of an image-capturing apparatus 1 of a first embodiment according to the present technology.

The image-capturing apparatus 1 of the present embodiment includes a first processing circuit section and a second processing circuit section, the first processing circuit section including a tone controller 23 that imparts tone curve characteristics for tone adjustment to an input video signal having linear characteristics, the second processing circuit section including a curve characteristics imparting section 26 that imparts, to the video signal processed by the first processing circuit section, first curve characteristics for output, and generates a first output video signal. Here, the input video signal having linear characteristics exhibits characteristics in which an output signal is substantially linearly increased with respect to an amount of input light, and is at least a signal before curve characteristics for outputting a video are imparted to the signal. The input video signal having linear characteristics is favorably a signal after correction processing such as defect correction and lens aberration correction, and gain adjustment are performed on the signal, and before detail-and-knee processing is performed on the signal.

Further, in the image-capturing apparatus 1 of the preset embodiment, the first processing circuit section further includes a preprocessor 21 and an RGB gain adjuster 22 that perform correction and color balance adjustment with respect to a signal generated by an imaging element, and the tone controller 23 is configured to process, as an input video signal, a signal generated by the preprocessor 21 and the RGB gain adjuster 22.

The image-capturing apparatus 1 of the present embodiment is described below in more detail.

The image-capturing apparatus 1 includes an optical system 11 that includes a lens group for performing image-capturing, and an image-capturing section 12 that includes an imaging element such as a complementary metal-oxide-semiconductor (CMOS) element or a charge-coupled device (CCD). The image-capturing section 12 converts, using the imaging element, light entering via the optical system 11 into an electrical pixel signal depending on light intensity, and supplies the electrical pixel signal to a video signal processor 20.

The video signal processor 20 includes the preprocessor 21, the RGB gain adjuster 22, the tone controller 23, a matrix processor 24, a detail-and-knee processor 25, the curve characteristics imparting section 26, and a formatter 27.

Further, the image-capturing apparatus 1 includes a CPU 28 that performs an overall control on the apparatus. The CPU 28 is capable of communicating with an operation section 40. The operation section 40 includes a display 41 and an operation input section 42. The CPU 28 performs a corresponding control according to an instruction input by a user using the operation section 40, and receives input of various parameters such as setting information regarding tone curve characteristics, the input being performed by the user using the operation section 40. The operation input section 42 may include, for example, an operation key, a mouse, a trackball, a dial, a lever, a touch sensor panel, and a remote controller. The display 41 may be a viewfinder.

Returning to the description of the configuration of the video signal processor 20.

The preprocessor 21 performs correction such as defect correction and lens aberration correction with respect to the pixel signal supplied by the image-capturing section 12.

The RGB gain adjuster 22 controls an RGB gain for adjusting white balance in addition to adjusting a master gain.

The tone controller 2 imparts tone curve characteristics to the pixel signal (the input video signal) having passed through the preprocessor 21 and the RGB gain adjuster 22.

The matrix processor 24 performs, for example, debayering processing and linear matrix processing on the pixel signal having passed through the tone controller 23 to generate color image data.

The detail-and-knee processor 25 performs detail processing and knee correction on the color image data.

The curve characteristics imparting section 26 imparts, to the color image data having passed through the detail-and-knee processor 25, curve characteristics for outputting a video for, for example, SDR display gamma processing or HDR optical-electro transfer function (OETF) conversion.

The formatter 27 converts the color image data into a transmission format for output to generate an output video signal.

In the present embodiment, tone curve characteristics based on setting information provided by a user are imparted by the tone controller 23 to a pixel signal (an input video signal) having linear characteristics with respect to light intensity, the pixel signal (the input video signal) being a pixel signal (an input video signal) before curve characteristics for outputting a video for SDR gamma processing or HDR OETF conversion are imparted to the pixel signal (the input video signal). This enables the user to perform any tone adjustment just by inputting setting information regarding tone curve characteristics, regardless of curve characteristics for output, such as SDR display gamma characteristics or HDR OETF characteristics, that are imparted to a video signal, and this results in being able to reduce burden on the user. Here, first, only curve characteristics for tone adjustment may be imparted to a linear input video signal, and this makes it possible to make signal processing simpler, compared to a method performed by combining curve characteristics for output and curve characteristics for tone adjustment.

Second Embodiment

Next, an image-capturing apparatus is described that makes it possible to generate two types of output video signals at the same time from an input video signal to which tone curve characteristics have been imparted in a linear region. Here, a first video and a second video are assumed to be the two types of output video signals, the first video having a first dynamic range, the second dynamic range having a second dynamic range wider than the dynamic range of the first video. A second embodiment according to the present technology is described below, with the first video having the first dynamic range being referred to as an SDR video, and the second video having the second dynamic range being referred to as an HDR video.

Figure 2:
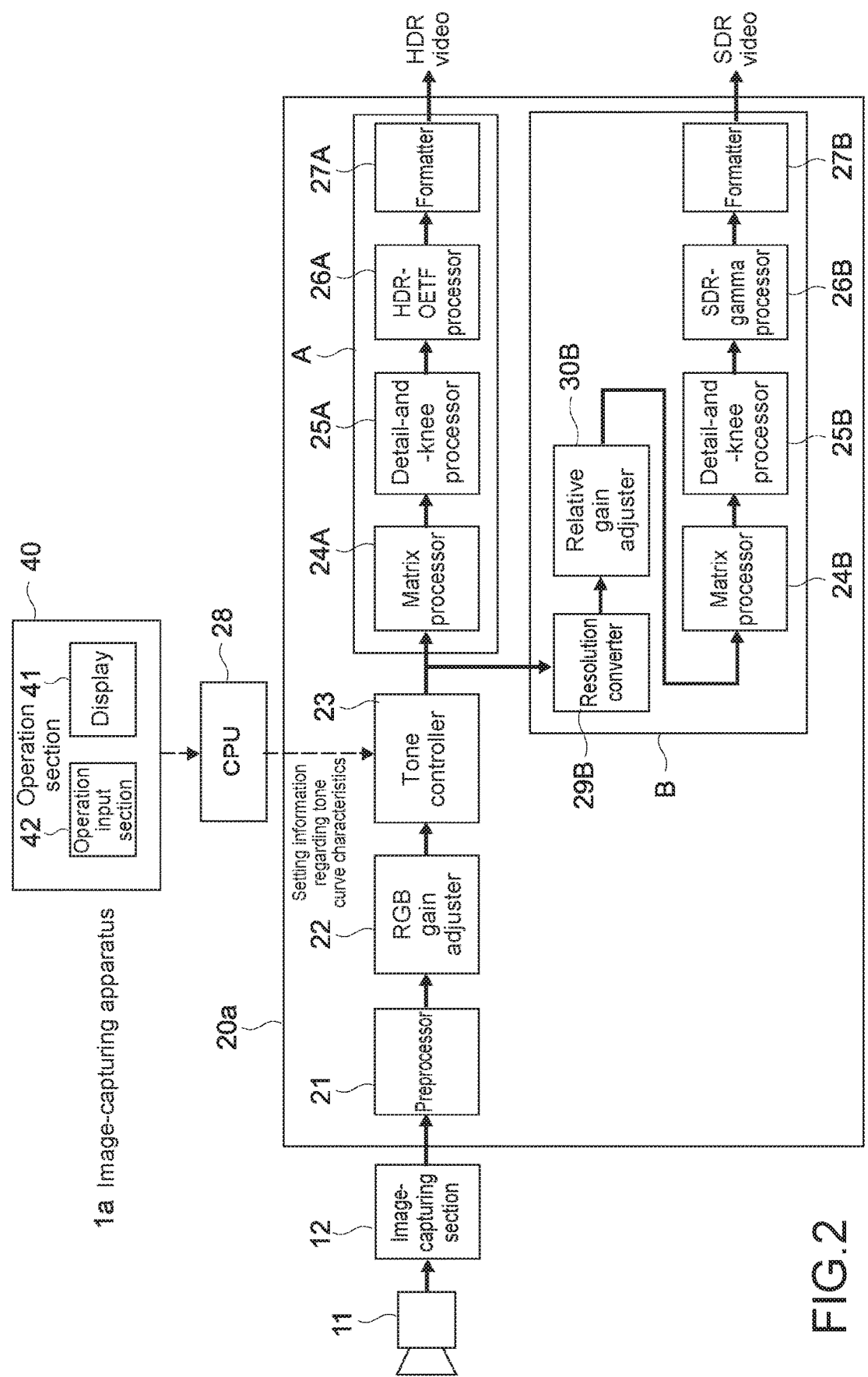
FIG. 2 is a block diagram illustrating a configuration of an image-capturing apparatus 1a of second embodiment according to the present technology.

FIG. 2 is a block diagram illustrating a configuration of an image-capturing apparatus 1a of the second embodiment according to the present technology.

In the image-capturing apparatus 1a of the present embodiment, the second processing circuit section further includes an SDR-gamma processor 26B that imparts, to the video signal processed by the first processing circuit section, second curve characteristics for output, and generates a second output video signal.

The image-capturing apparatus 1a of the present embodiment is described below in more detail.

The optical system 11 and the image-capturing section 12, as well as the preprocessor 21, the RGB gain adjuster 22, and the tone controller 23 that are included in a video signal processor 20a in the image-capturing apparatus 1a have the same configuration as the video signal processor 20 of the first embodiment.

The video signal processor 20a includes an HDR-process section A and an SDR-process section B at the output side of the tone controller 23.

The HDR-process section A performs processing of generating an HDR video from a video signal to which tone curve characteristics have been imparted by the tone controller 23. The HDR-process section A includes a matrix processor 24A, a detail-and-knee processor 25A, an HDR-OETF processor 26A, and a formatter 27A.

The matrix processor 24A performs, for example, debayering processing and linear matrix processing on a pixel signal output by the tone controller 23 to generate color image data.

The detail-and-knee processor 25A performs detail processing and knee processing on the color image data generated by the matrix processor 24A.

The HDR-OETF processor 26A imparts, to the color image data having passed through the detail-and-knee processor 25A, curve characteristics for optical-electro transfer function (OETF) for HDR.

The formatter 27A converts, into a transmission format for an HDR video, color image data generated by the HDR-OETF processor 26A.

On the other hand, the SDR-process section B includes a resolution converter 29B, a relative gain adjuster 30B, a matrix processor 24B, a detail-and-knee processor 25B, the SDR-gamma processor 26B, and a formatter 27B.

The resolution converter 29B converts the resolution (for example, 4K resolution) of a pixel signal into a lower resolution, such as HD, than that of the image signal, the pixel signal being supplied by the tone controller 23.

The relative gain adjuster 30B controls a master gain according to a relative gain, and controls an RGB gain for adjusting white balance. Here, the relative gain is information used to set a correlation between a dynamic range of an SDR video and a dynamic range of an HDR video. The setting of the relative gain, a change in the relative gain, and the like can be performed by the CPU28.

The matrix processor 24B performs, for example, debayering processing and linear matrix processing on a pixel signal having passed through the relative gain adjuster 30B to obtain color image data.

The detail-and-knee processor 25B performs detail processing and knee correction on the color image data.

The SDR-gamma processor 26B imparts, to the color image data having passed through the detail-and-knee processor 25B, curve characteristics for gamma processing for SDR, and curve characteristics for gamma processing for an output-destination display.

The formatter 27B converts the color image data into a transmission format for an SDR video.

Note that the dynamic range of an HDR video is wider than the dynamic range of an SDR video. For example, when the dynamic range of an SDR video is from 0% to 100%, the luminance dynamic range of an HDR video is, for example, from 0% to 1200% with Hybrid Log Gamma (HLG). The luminance range of output of the image-capturing section 12 is, for example, from 0% to 1300%.

In the image-capturing apparatus 1a having the configuration described above, a video signal obtained by the tone controller 23 imparting arbitrary tone curve characteristics to a pixel signal (an input signal) having linear characteristics, is supplied to the HDR-process section A and the SDR-process section B. Then, curve characteristics for OETF conversion are imparted to the video signal by the HDR-process section A, and curve characteristics for gamma processing is imparted to the video signal by the SDR-process section B. Accordingly, even when SDR gamma characteristics and HDR OETF characteristics are very different from each other, a signal obtained by imparting curve characteristics for tone adjustment to a linear input signal, can be dealt with as if it is a reference signal in such a lighting environment upon image-capturing, and the HDR-process section A and the SDR-process section B can respectively impart SDR gamma characteristics and HDR OETF characteristics to the reference signal. This results in being able to generate an HDR video and an SDR video in parallel in real time (for example, at the same time) by performing relatively easy signal processing, the HDR video and the SDR video being videos on which tone adjustment desired by a user is equally performed. Further, it is no longer necessary to separately perform tone adjustment with respect to a video signal on which SDR gamma processing has been performed and with respect to a video signal on which HDR OETF conversion has been performed, such that how an image finally looks (a final tone) is desired by the user, and this results in being able to reduce burden on the user upon tone adjustment.

Third Embodiment

Figure 3:
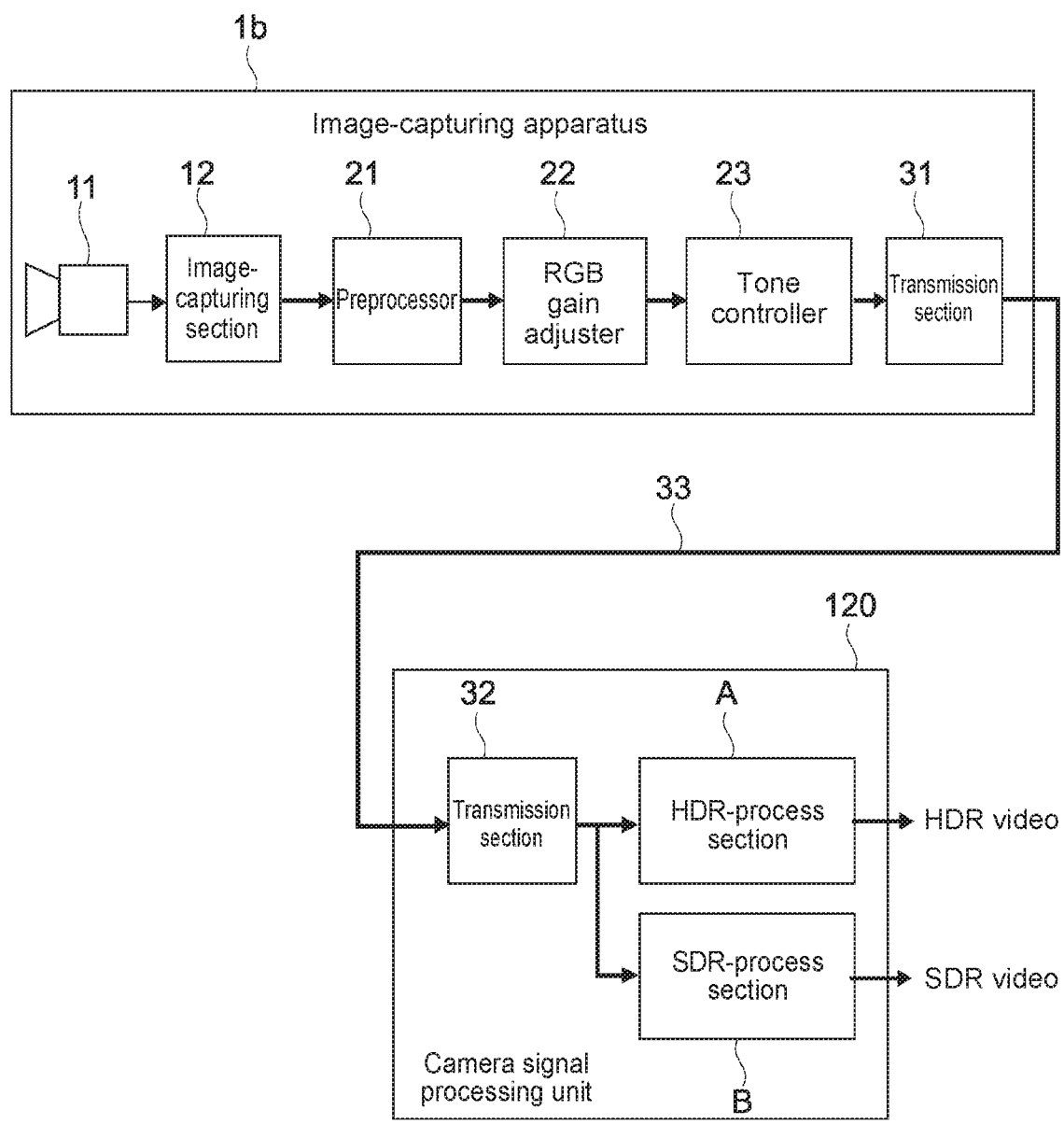
FIG. 3 is a block diagram illustrating a configuration of an image-capturing system 100 of a third embodiment according to the present technology.

FIG. 3 is a block diagram illustrating a configuration of an image-capturing system 100 of a third embodiment according to the present technology.

The image-capturing system 100 includes an image-capturing apparatus 1b and a camera signal processing unit 120. The image-capturing apparatus 1b includes the optical system 11, the image-capturing section 12, the preprocessor 21, the RGB gain adjuster 22, the tone controller 23, and a transmission section 31. The camera signal processing unit 120 includes a transmission section 32, the HDR-process section A, and the SDR-process section B. Here, the image-capturing apparatus 1b and the camera signal processing unit 120 are connected to each other through the respective transmission sections 31 and 32 via a camera cable 33 such as an optical cable.

In the image-capturing system 100, a video signal to which tone curve characteristics have been imparted by the tone controller 23 of the image-capturing apparatus 1b, is transmitted to the camera signal processing unit 120 connected to the image-capturing apparatus 1b through the transmission section 31 via the camera cable 33. In the camera signal processing unit 120, the video signal transmitted from the image-capturing apparatus 1b via the camera cable 33 is received by the transmission section 32 and supplied to the HDR-process section A and the SDR-process section B to generate an HDR video and an SDR video in parallel in real time (for example, at the same time).

Further, the tone controller may be moved from the image-capturing apparatus 1b to the output side of the transmission section of the signal processing unit 120.

[Configuration of Tone Controller]

Next, a configuration of the tone controller 23 in each of the embodiments according to the present technology is described.

(First Configuration Example)

Figure 4:
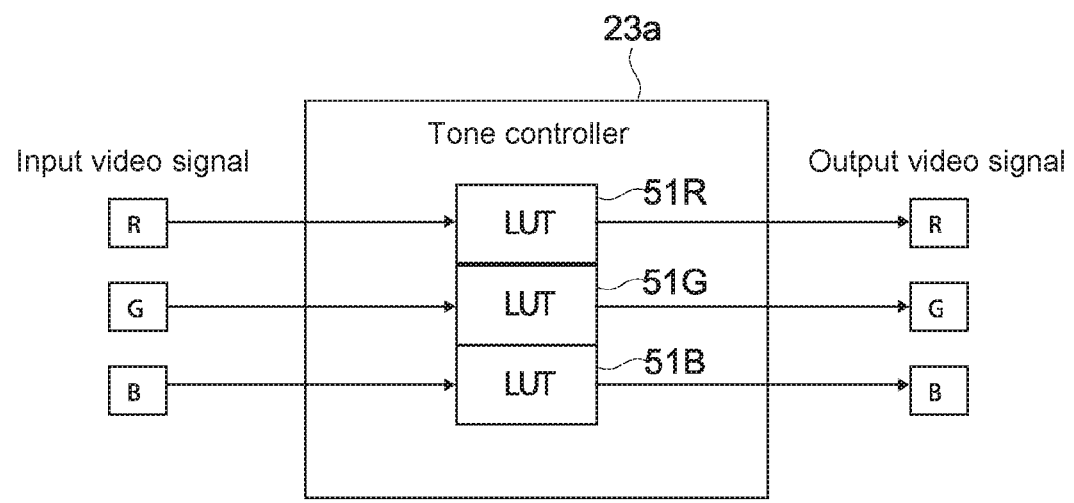
FIG. 4 is a block diagram illustrating a first configuration example of a tone controller.

FIG. 4 is a block diagram illustrating a first configuration example of the tone controller.

This tone controller 23a includes look up tables (LUTs) 51, 52, and 53 for respective components of colors of, for example, red, green, and blue. Values to which tone curve characteristics have been imparted are respectively registered in the look up tables (LUTs) 51R, 51G, and 51B in the form of a table with respect to values of input video signals for the respective color components. Alternatively, the tone controller 23a can be implemented by having a configuration of imparting a polygonal line approximated curve for each color component. In other words, in the tone controller 23a, a video signal to which arbitrary tone curve characteristics have been imparted is generated by reading respective video signals to which tone curve characteristics have been imparted from the look up tables (LUTs) 51R, 51G, and 51B for the respective color components with respect to input video signals for the respective color components.

(Second Configuration Example)

Figure 5:
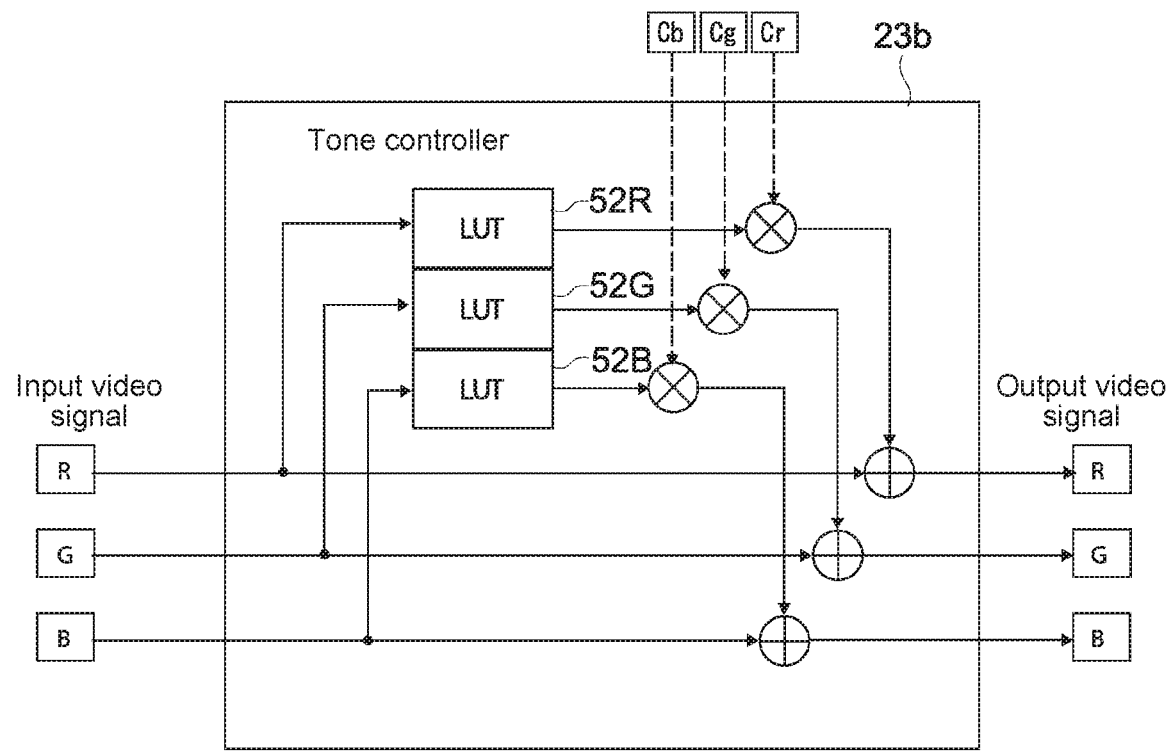
FIG. 5 is a block diagram illustrating a second configuration example of the tone controller.

FIG. 5 is a block diagram illustrating a second configuration example of the tone controller.

In this tone controller 23b, values of variation (difference) obtained by imparting tone curve characteristics are respectively read from look up tables (LUTs) 52R, 52G, and 52B with respect to values of input video signals for the respective color components. The values respectively read from the look up tables (LUTs) 52R, 52G, and 52B are arbitrarily adjusted by being respectively multiplied by gain adjustment values Cr, Cg, and Cb that are arbitrarily given for the respective color components, and the adjusted values are respectively added to input video signals for the respective color components. Consequently, a video signal obtained by imparting arbitrary tone curve characteristics to an input video signal is obtained.

(Third Configuration Example)

Figure 6:
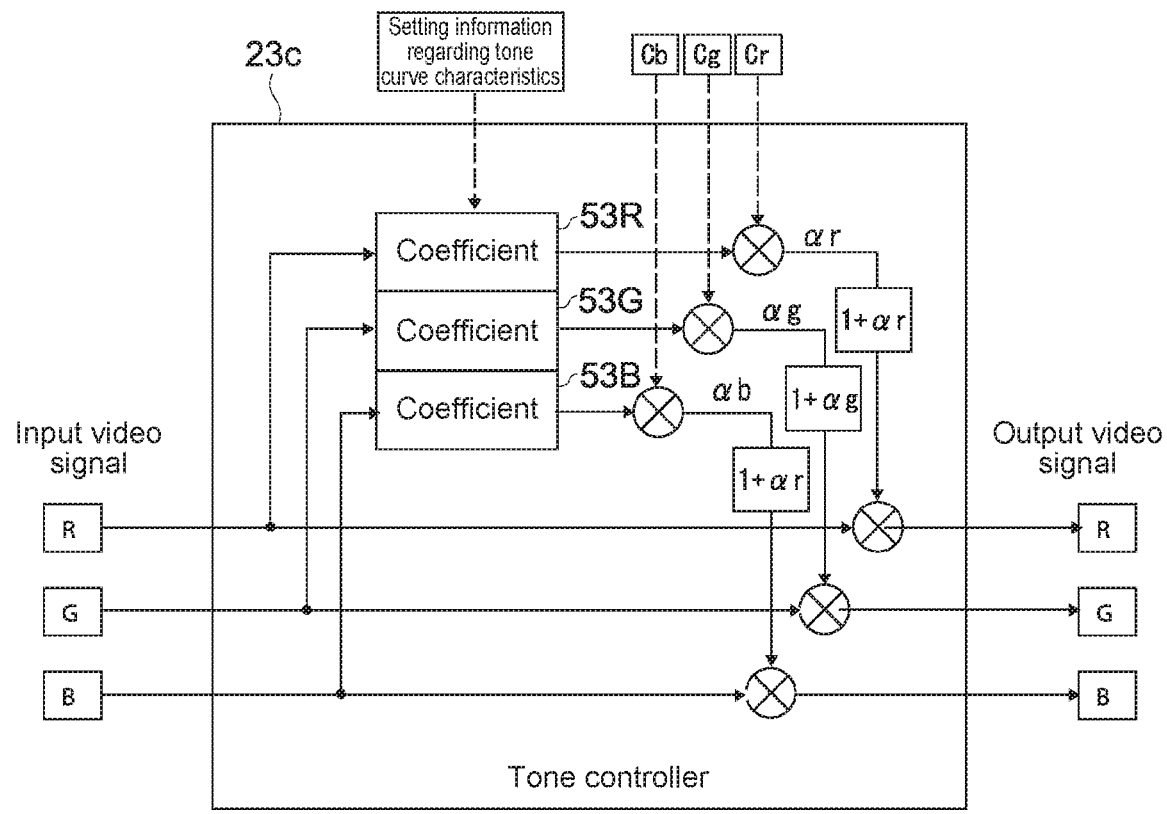
FIG. 6 is a block diagram illustrating a third configuration example of the tone controller.

FIG. 6 is a block diagram illustrating a third configuration example of the tone controller.

This tone controller 23c generates tone curve characteristics for tone adjustment using setting information regarding tone curve characteristics.

In other words, first, the tone controller 23c generates coefficients 53R, 53G, and 53B for respective color components with respect to values of input video signals for the respective color components, using setting information regarding tone curve characteristics. Here, the setting information regarding tone curve characteristics may be a shared setting for all of the color components, or may be different settings for the respective color components. The respective coefficients 53R, 53G, and 53B are respectively adjusted by being multiplied by the gain adjustment values Cr, Cg, and Cb that are arbitrarily given for the respective color components, and "one" is added to each of the adjusted coefficients 53R, 53G, and 53B. Values generated for the respective color components as described above are a result of setting tone curve characteristics. The input video signals for the corresponding color components are respectively multiplied by the values generated for the respective color components as the result of setting tone curve characteristics. Consequently, arbitrary tone curve characteristics are imparted to an input video signal.

(Fourth Configuration Example)

Figure 7:
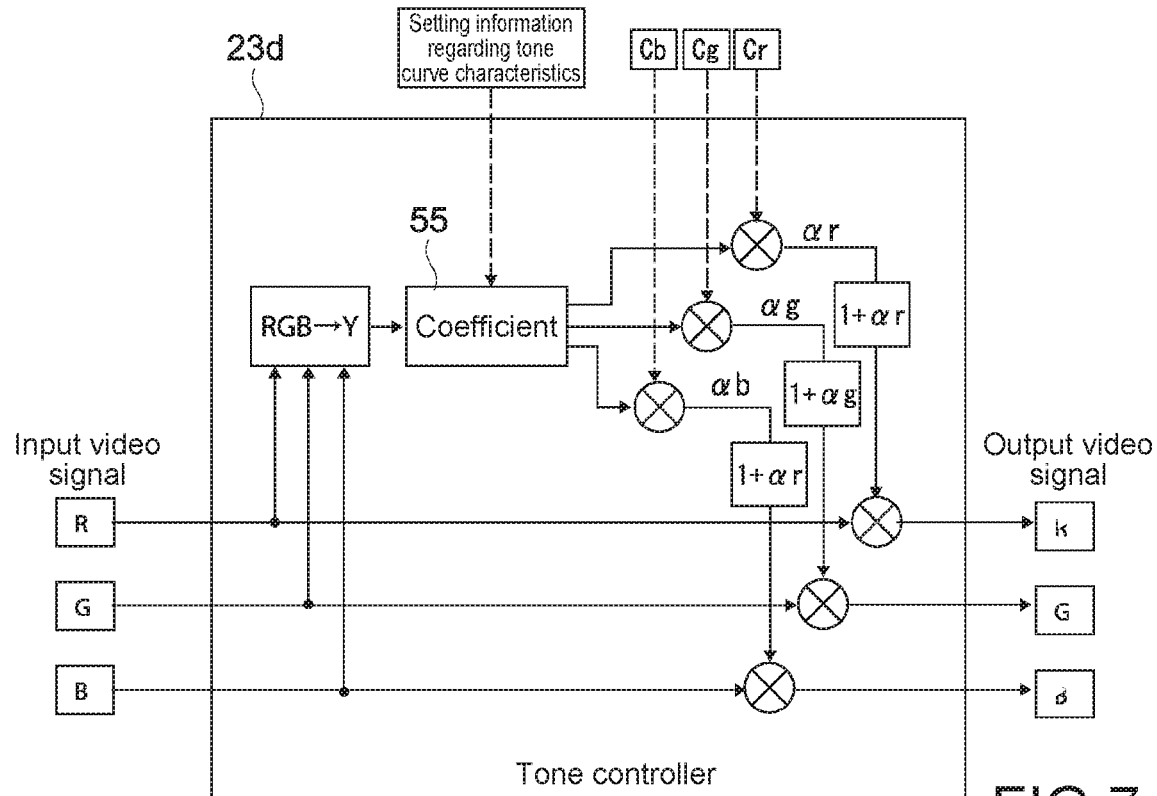
FIG. 7 is a block diagram illustrating a fourth configuration example of the tone controller.

FIG. 7 is a block diagram illustrating a fourth configuration example of the tone controller.

The tone controller 23d generates a luminance signal (Y) of input video signals, and generates a coefficient 55 with respect to the luminance signal (Y), using setting information regarding tone curve characteristics. The generated coefficient 55 is multiplied by each of the gain adjustment values Cr, Cg, and Cb that are arbitrarily given for the respective color components to obtain coefficients for the respective color components, and one is added to each of the obtained coefficients. Values generated for the respective color components as described above are a result of setting tone curve characteristics. The input video signals for the corresponding color components are respectively multiplied by the values generated for the respective color components as the result of setting tone curve characteristics. Consequently, arbitrary tone curve characteristics are imparted to an input video signal.

(Fifth Configuration Example)

Figure 8:
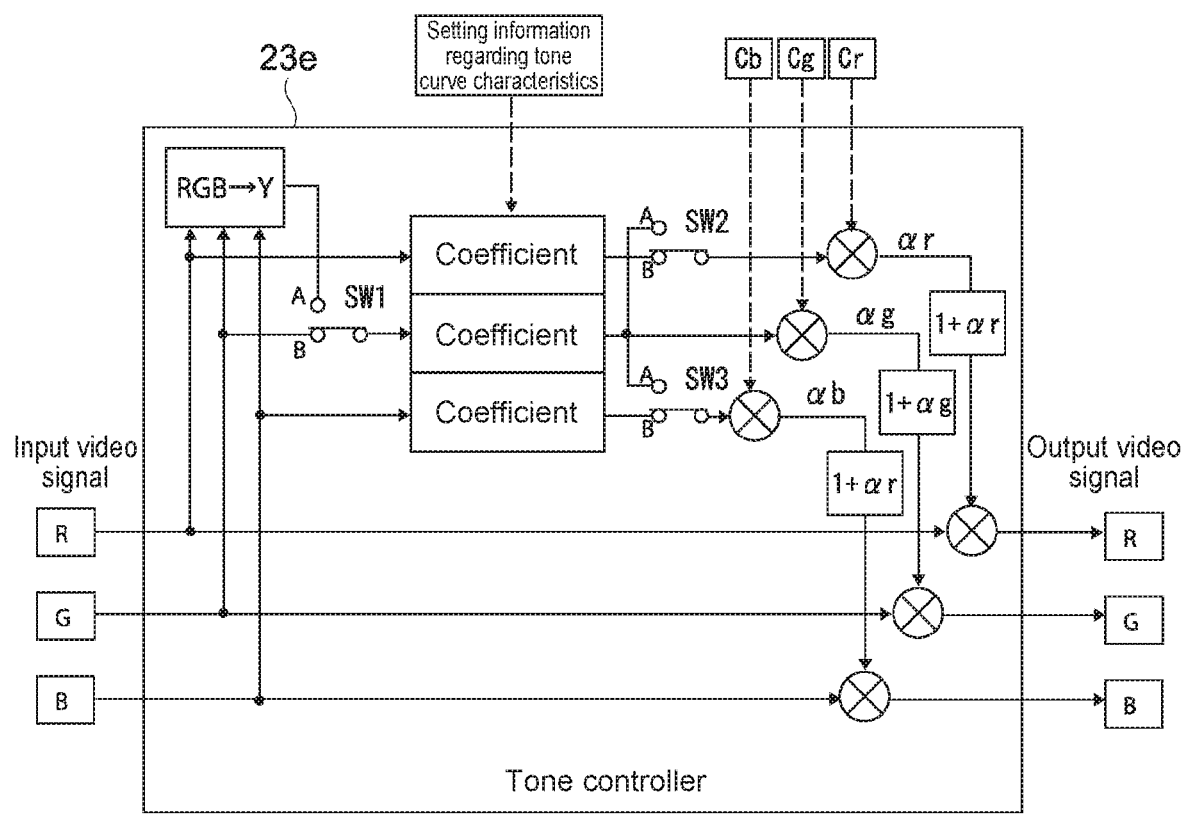
FIG. 8 is a block diagram illustrating a fifth configuration example of the tone controller.

FIG. 8 is a block diagram illustrating a fifth configuration example of the tone controller.

This tone controller 23e is configured such that switching can be performed between a function of the tone controller 23c that is the third configuration example and a function of the tone controller 23d that is the fourth configuration example using a plurality of switches SW1, SW2, and SW3. Switching of the plurality of switches SW1, SW2, and SW3 is performed using the CPU 28 receiving an instruction given by a user using the operation section 40. The switching of the plurality of switches SW1, SW2, and SW3 is performed between an A side and a B side in synchronization with one another.

When the respective switches SW1, SW2, and SW3 have been switched to the A side, a coefficient is generated with respect to a luminance signal (Y) of input video signals, using setting information regarding tone curve characteristics. The generated coefficient is multiplied by each of the gain adjustment values Cr, Cg, and Cb that are arbitrarily given for the respective color components to obtain coefficients for the respective color components, "one" is added to each of the obtained coefficients, and the input video signals for the corresponding color components are respectively multiplied by the obtained coefficients to which "one" has been added. Consequently, when the respective switches SW1, SW2, and SW3 have been switched to the A side, the tone controller 23e operates similarly to the tone controller 23d that is the fourth configuration example.

On the other hand, when the respective switches SW1, SW2, and SW3 have been switched to the B side, coefficients are generated for respective color components with respect to input video signals for the respective color components, using setting information regarding tone curve characteristics. The respective coefficients are respectively adjusted by being multiplied by the gain adjustment values Cr, Cg, and Cb that are arbitrarily given for the respective color components, "one" is added to each of the adjusted coefficients, and the input video signals for the corresponding colors are respectively multiplied by the obtained coefficients to which "one" has been added. Consequently, the tone controller 23e operates similarly to the tone controller 23c that is the third configuration example.

As a result, rt is possible to switch as appropriate between two types of tone controls that are a tone control based on a value for each color component and a tone control based on a value based on a luminance component, and thus to switch how a video looks.

Note that the gain adjustment values Cr, Cg, and Cb are parameters that can be set by a user as appropriate in real time for respective color components separately from tone curve characteristics. The user can set the gain adjustment values Cr, Cg, and Cb for the respective color components discretionarily while viewing an output video that is an adjustment result.

Figure 15:
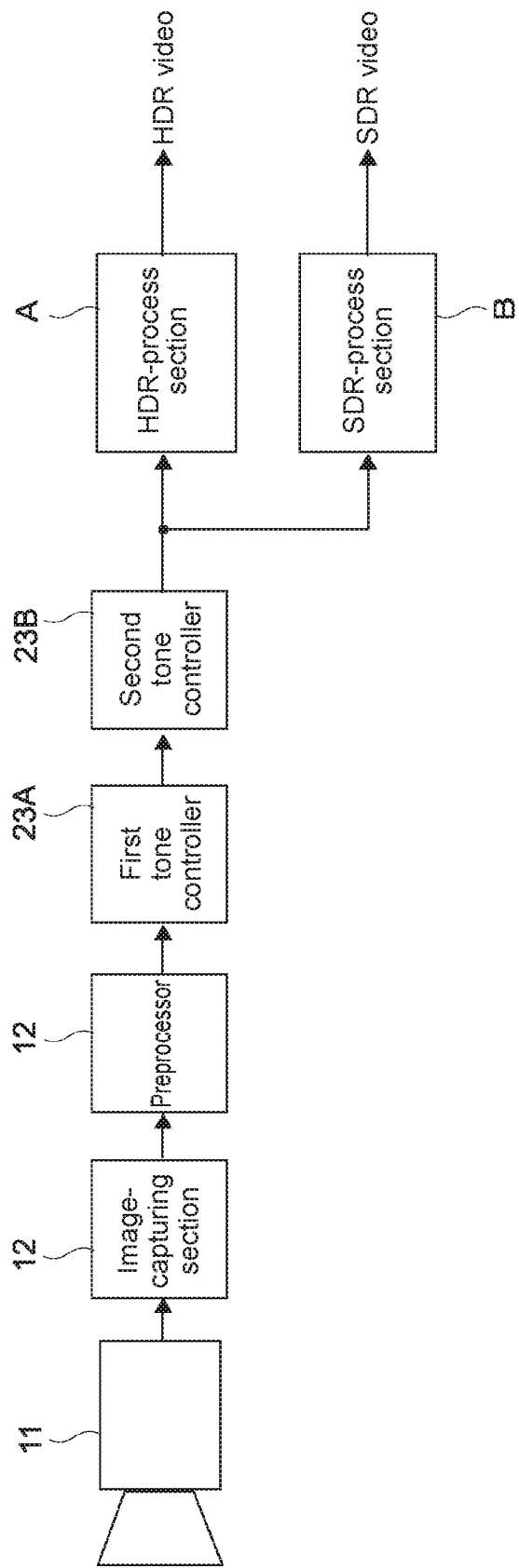
FIG. 15 is a block diagram illustrating a configuration of an image-capturing apparatus using a plurality of tone controllers.

The tone controller 23c that is the third configuration example and the tone controller 23d that is the fourth configuration example each generate a gain by which an input video signal is multiplied, using setting information regarding tone curve characteristics. The tone controllers 23 such as the tone controller 23c and the tone controller 23d that arithmetically control a tone can be provided in series as a first tone controller 23A and a second tone controller 23B, for example, as illustrated in FIG. 15. Here, the first tone controller 23A and the second tone controller 23B may both be the tone controller 23c that is the third configuration example, or may both be the tone controller 23d that is the fourth configuration example. Alternatively, the first tone controller 23A and the second tone controller 23B may be a combination of the tone controller 23c that is the third configuration example and the tone controller 23d that is the fourth configuration example.

Figure 16:
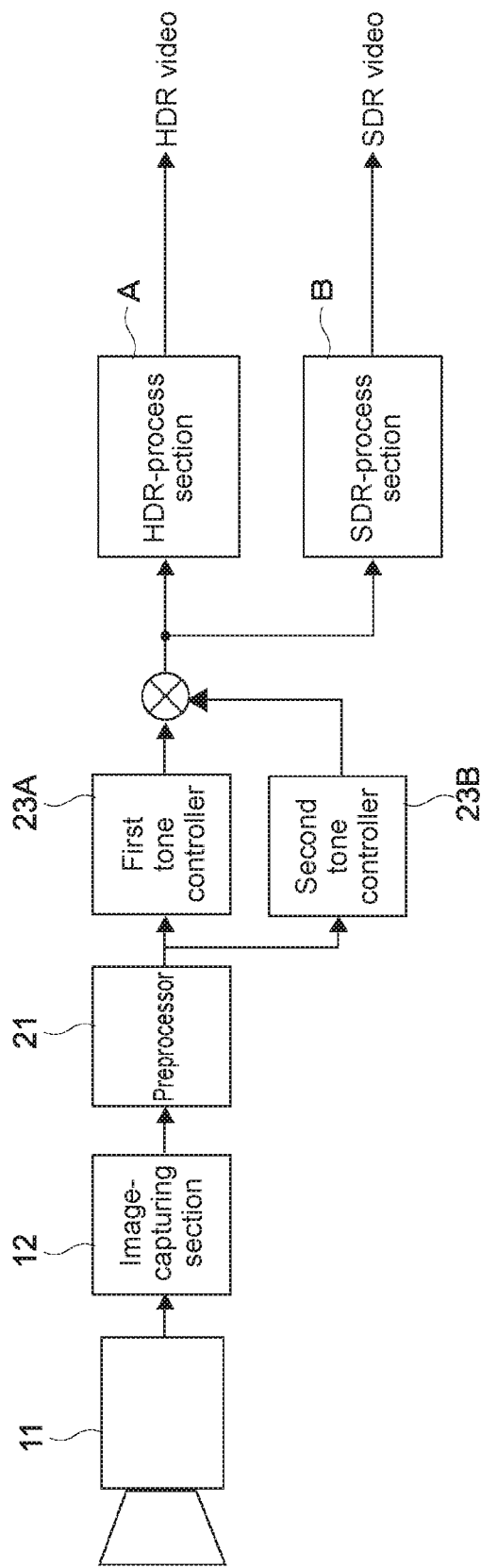
FIG. 16 is a block diagram illustrating another configuration of the image-capturing apparatus using the plurality of tone controllers.

Further, as illustrated in FIG. 16, a configuration in which an input video signal is multiplied by a result of combining gains respectively generated by the tone controllers 23A and 23B, may also be adopted.

(Regarding Setting Information Regarding Tone Curve Characteristics)

In the present embodiment, a luminance center, a luminance range, a curved shape, and an amplitude are provided by a user using the operation section 40 as parameters that are setting information regarding tone curve characteristics.

Figure 9:
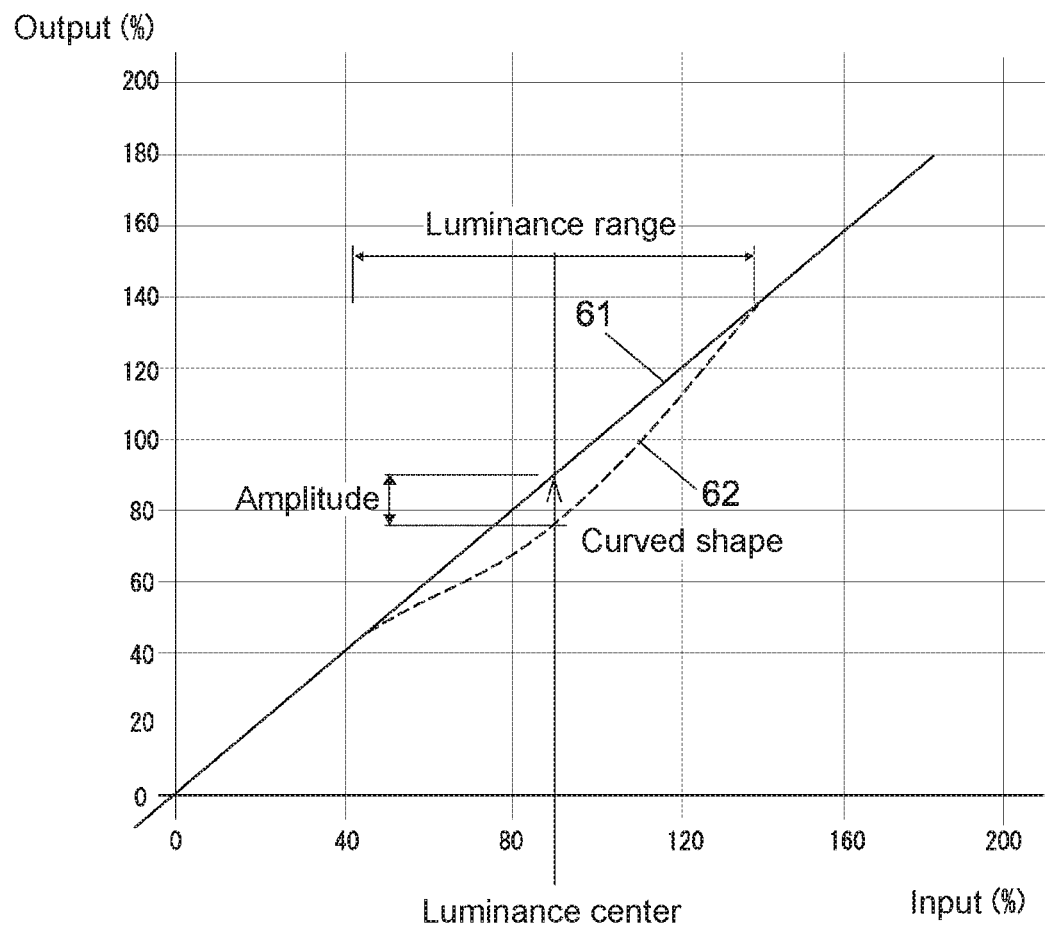
FIG. 9 is a diagram describing four parameters that are setting information regarding tone curve characteristics.

FIG. 9 is a diagram describing four parameters for setting information regarding tone curve characteristics.

Here, the horizontal axis represents the level of a signal input to the tone controller 23, and the vertical axis represents the level of a signal output from the tone controller 23. Values of the input signal level and the output signal level are each given according to the value of percentage when a dynamic range of an SDR video is from 0% to 100%.

In the figure, a solid straight line 61 represents linear characteristics before tone curve characteristics are imparted. A dotted line 62 represents imparted tone curve characteristics. The luminance center is the center of a range of the level of an input signal to which tone curve characteristics are imparted. For example, in the example of FIG. 9, the 90% input signal level is set to be the luminance center. The luminance range represents a range of the level of an input signal to which tone curve characteristics are imparted. The curved shape is a parameter that defines a curved shape of tone curve characteristics. The use of the curved shape makes it possible to define, for example, asymmetric tone curve characteristics such as strengthening a tone on the high luminance side and weakening a tone on the low luminance side. The amplitude is given by an amount of variation in the output level at the luminance center.

Figure 10:
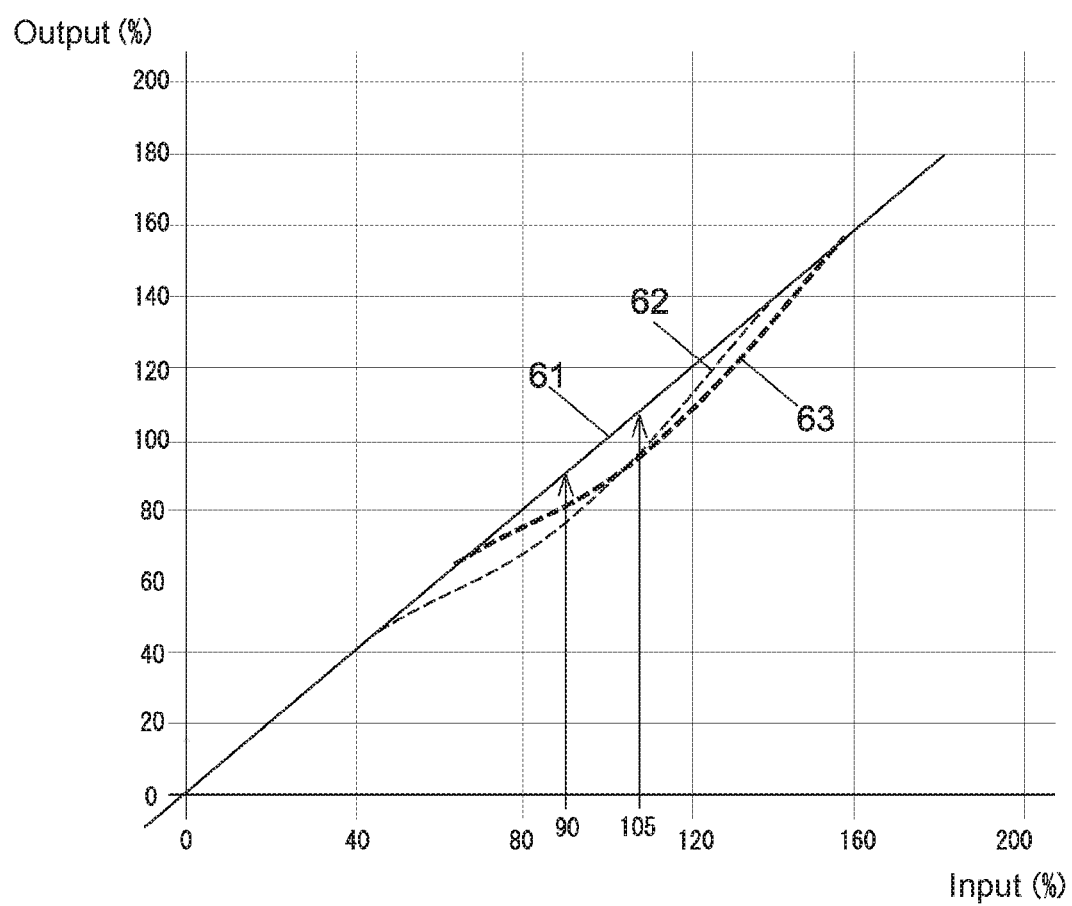
FIG. 10 illustrates tone curve characteristics 63 obtained by changing a luminance center with respect to tone curve characteristics 62 of FIG. 9.

FIG. 10 illustrates tone curve characteristics 63 obtained by changing the luminance center from the position of 90% for the tone curve characteristics 62 of FIG. 9 to the position of 105%.

Figure 11:
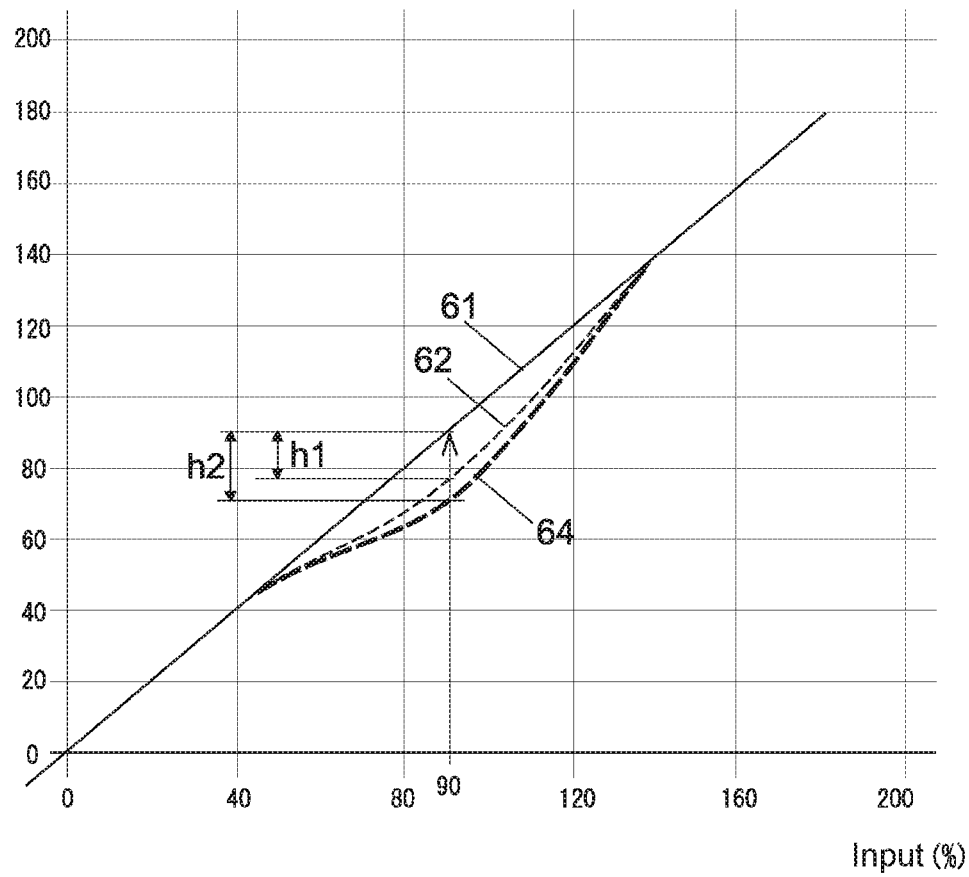
FIG. 11 illustrates tone curve characteristics 64 obtained by changing an amplitude.

FIG. 11 illustrates tone curve characteristics 64 obtained by increasing the amplitude from h1 for the tone curve characteristics 62 of FIG. 9 to h2.

Figure 12:
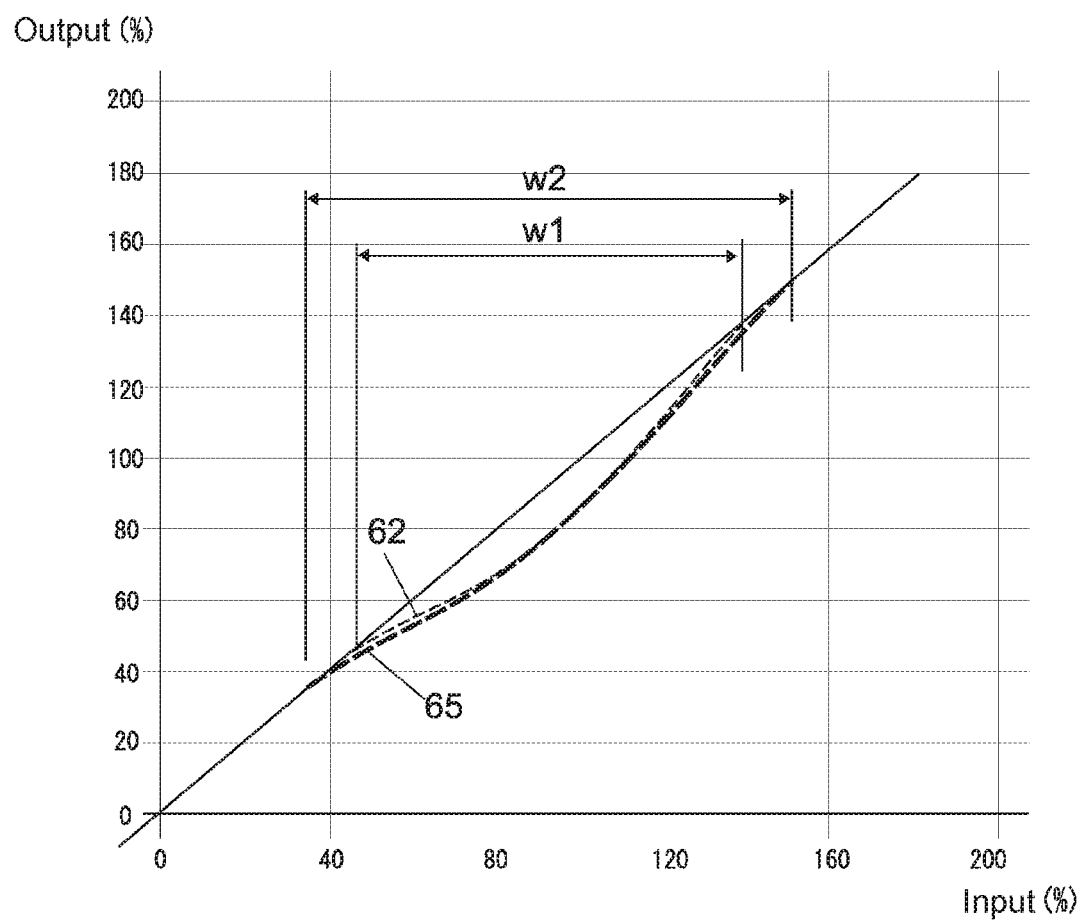
FIG. 12 illustrates tone curve characteristics 65 obtained by increasing a luminance range.

FIG. 12 illustrates tone curve characteristics 65 obtained by increasing the luminance range from w1 for the tone curve characteristics 62 of FIG. 9 to w2.

Figure 13:
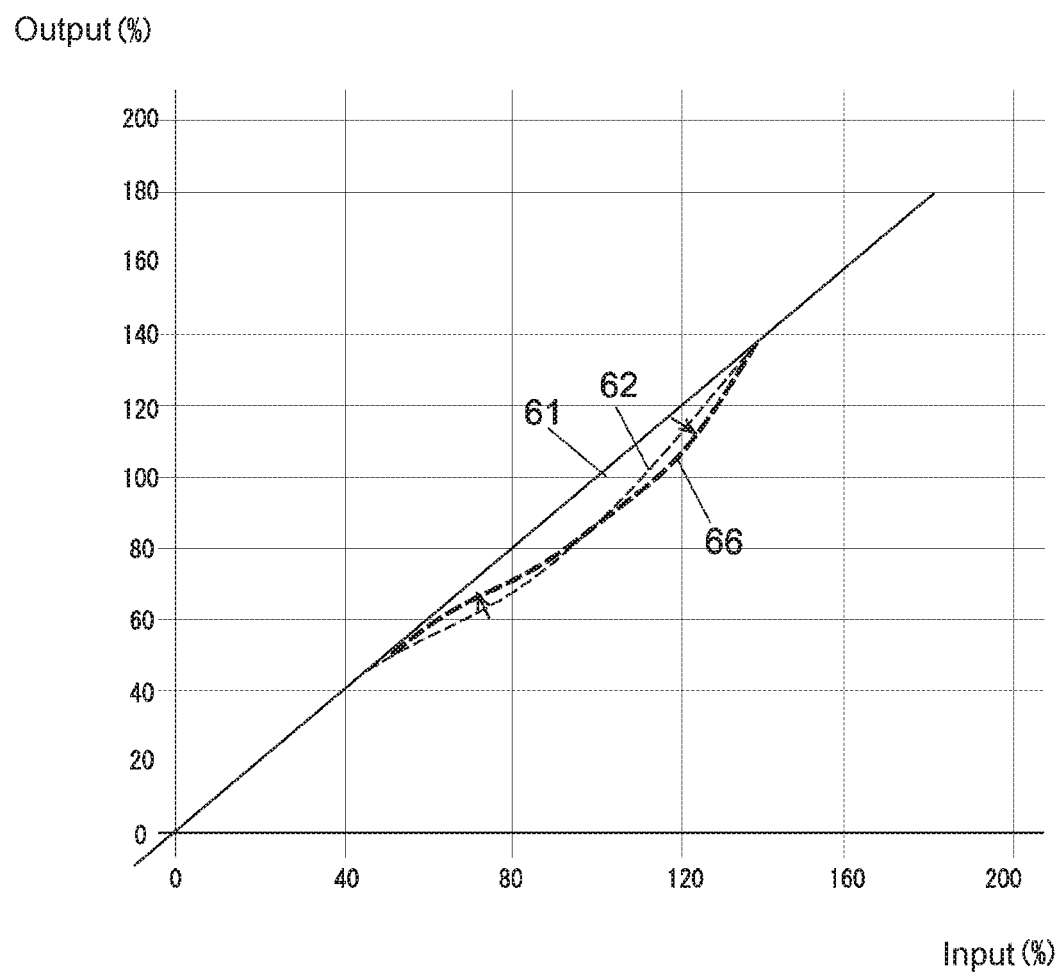
FIG. 13 illustrates tone curve characteristics 66 obtained by changing a curved shape.

FIG. 13 illustrates tone curve characteristics 66 obtained by changing the curved shape from the curved shape for the tone curve characteristics 62 of FIG. 9 to a curved shape in which a tone on the high luminance side is weakened and a tone on the low luminance side is strengthened.

Figure 14:
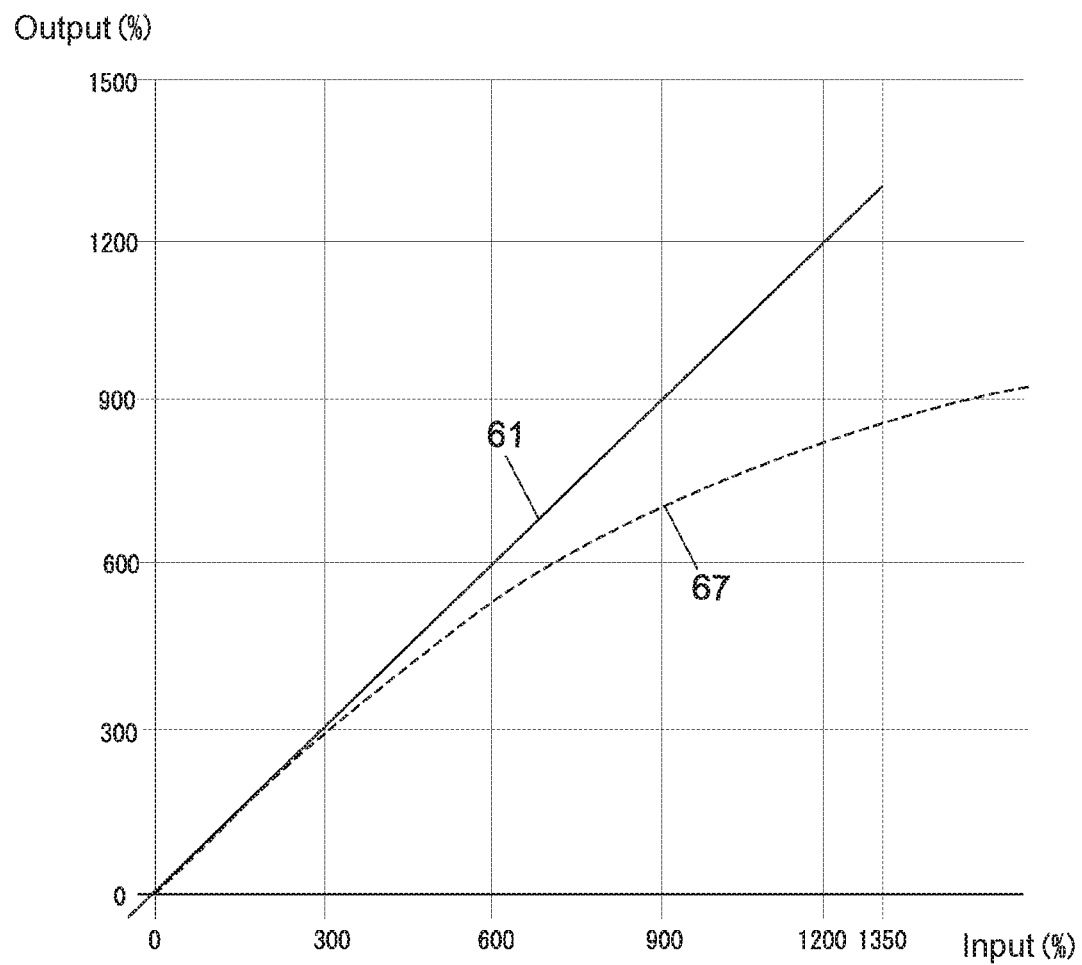
FIG. 14 illustrates an example of tone curve characteristics 67 obtained by imparting curve characteristics to an entire video signal.

Further, FIG. 14 illustrates an example of tone curve characteristics 67 obtained by imparting curve characteristics to an entire video signal by setting the luminance center in a range beyond the range (1300%) of an input signal and by setting the luminance range to at least 1.0 time the value of the luminance range.

As described above, in the present embodiment, it is possible to set various tone curve characteristics desired by a user with a high degree of freedom, using respective parameters such as the luminance center, the luminance range, the curved shape, and the amplitude.

A setting of the respective parameters that are setting information regarding tone curve characteristics, and a setting of the gain adjustment values Cr, Cg, and Cb can be performed by displaying, on the display 41 of the operation section 40, a graphical user interface (GUI) used to perform settings, and by a user operating the operation input section 42 with respect to the GUI. The respective parameters may be set by an operation input being performed on an operation input panel provided to a body of an image-capturing apparatus.

Application Examples

The technology according to the present disclosure is applicable to various products. For example, the technology according to the present disclosure may be applied to an operating room system.

Figure 17:
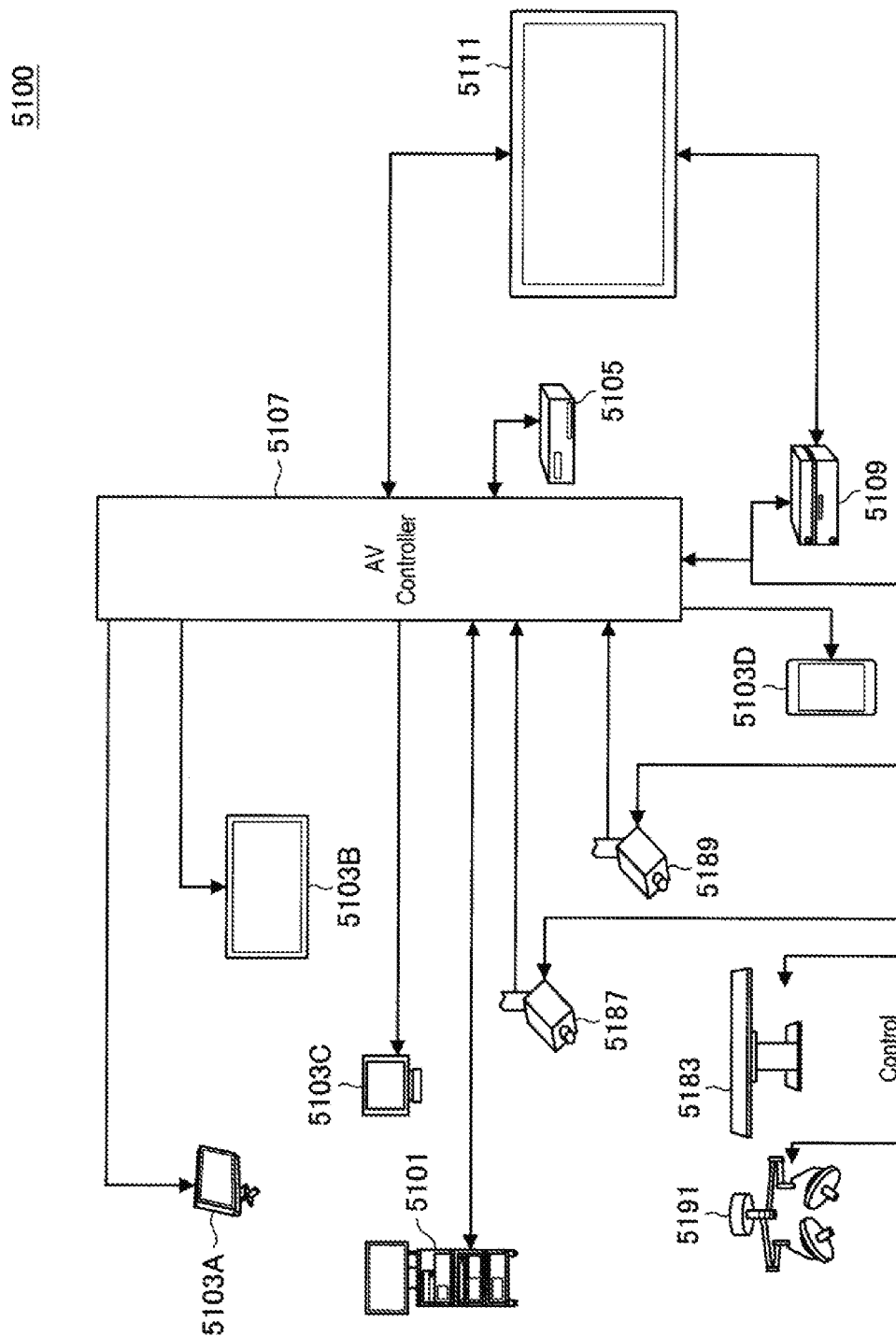
FIG. 17 is a view schematically depicting a general configuration of an operating room system.

FIG. 17 is a view schematically depicting a general configuration of an operating room system 5100 to which the technology according to an embodiment of the present disclosure can be applied. Referring to FIG. 17, the operating room system 5100 is configured such that a group of apparatus installed in an operating room are connected for cooperation with each other through an audiovisual (AV) controller 5107 and an operating room controlling apparatus 5109.

In the operating room, various apparatus may be installed. In FIG. 17, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of an operating room and images the hands of a surgeon. The surgery field camera 5189 is provided on the ceiling of the operating room and images a state of the entire operating room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the operating room separately from the endoscopic surgery system 5113. The apparatus which do not belong to the endoscopic surgery system 5113 are referred to also as non-medical equipment. The audiovisual controller 5107 and/or the operating room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the operating room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body cavity of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire operating room may be transmitted as display information. It is to be noted that, if a different apparatus having an image pickup function exists in the operating room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the operating room; the display apparatus 5103B is a display apparatus installed on a wall face of the operating room; the display apparatus 5103C is a display apparatus installed on a desk in the operating room; and the display apparatus 5103D is a mobile apparatus (for example, a tablet personal computer (PC)) having a display function.

Further, though not depicted in FIG. 17, the operating room system 5100 may include an apparatus outside the operating room. The apparatus outside the operating room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The operating room controlling apparatus 5109 integrally controls processes other than processes relating to image display on the non-medical equipment. For example, the operating room controlling apparatus 5109 controls driving of the patient bed 5183, the ceiling camera 5187, the surgery field camera 5189 and the illumination 5191.

In the operating room system 5100, a centralized operation panel 5111 is provided such that it is possible to issue an instruction regarding image display to the audiovisual controller 5107 or issue an instruction regarding operation of the non-medical equipment to the operating room controlling apparatus 5109 through the centralized operation panel 5111. The centralized operation panel 5111 is configured by providing a touch panel on a display face of a display apparatus.

Figure 18:
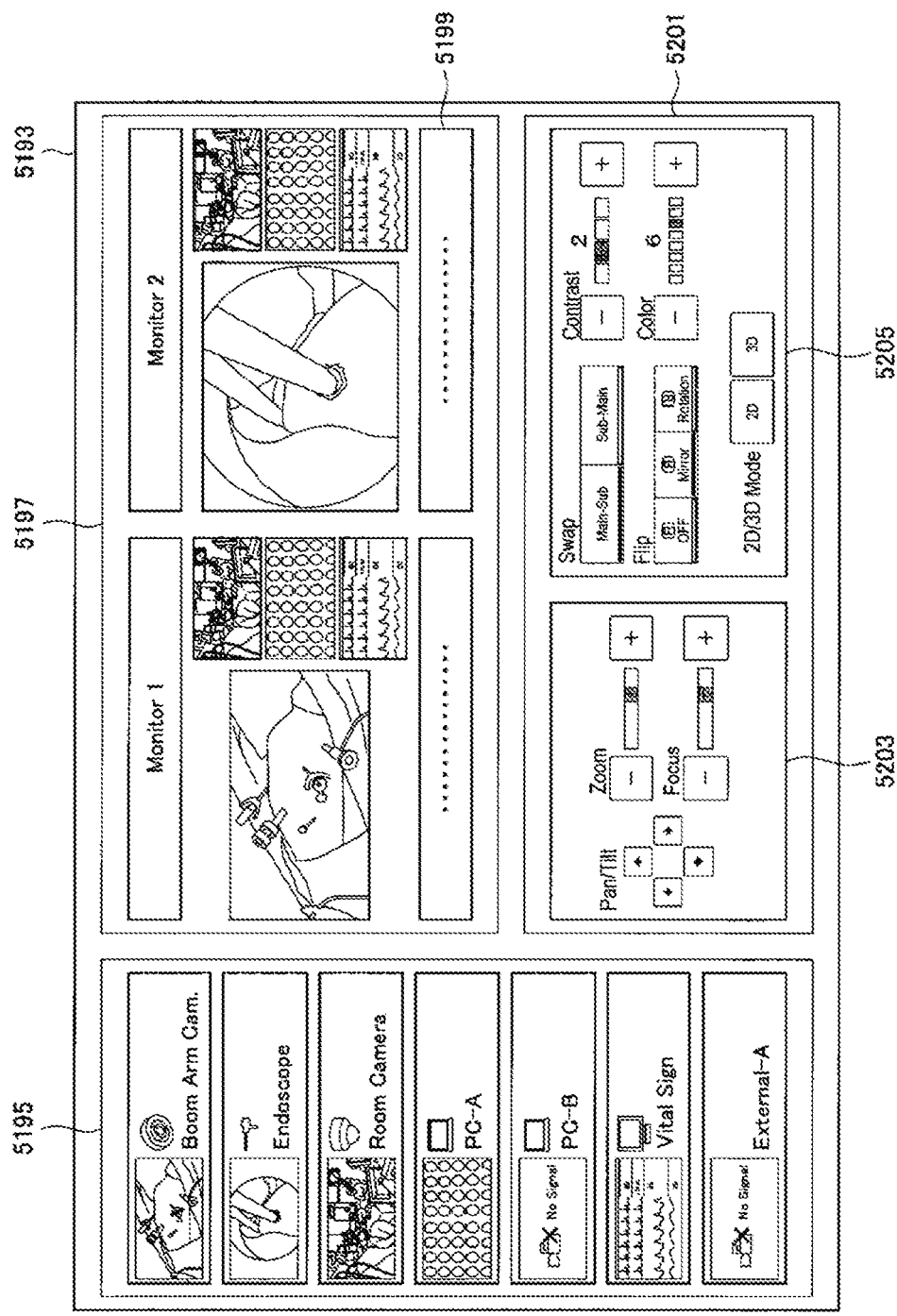
FIG. 18 is a view depicting an example of display of an operation screen image of a centralized operation panel.

FIG. 18 is a view depicting an example of display of an operation screen image on the centralized operation panel 5111. In FIG. 18, as an example, an operation screen image is depicted which corresponds to a case in which two display apparatus are provided as apparatus of an output destination in the operating room system 5100. Referring to FIG. 18, the operation screen image 5193 includes a sending source selection region 5195, a preview region 5197 and a control region 5201.

In the sending source selection region 5195, the sending source apparatus provided in the operating room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the operating room controlling apparatus 5109 provided in the operating room system 5100 through the central zed operation panel. 5111.

Figure 19:
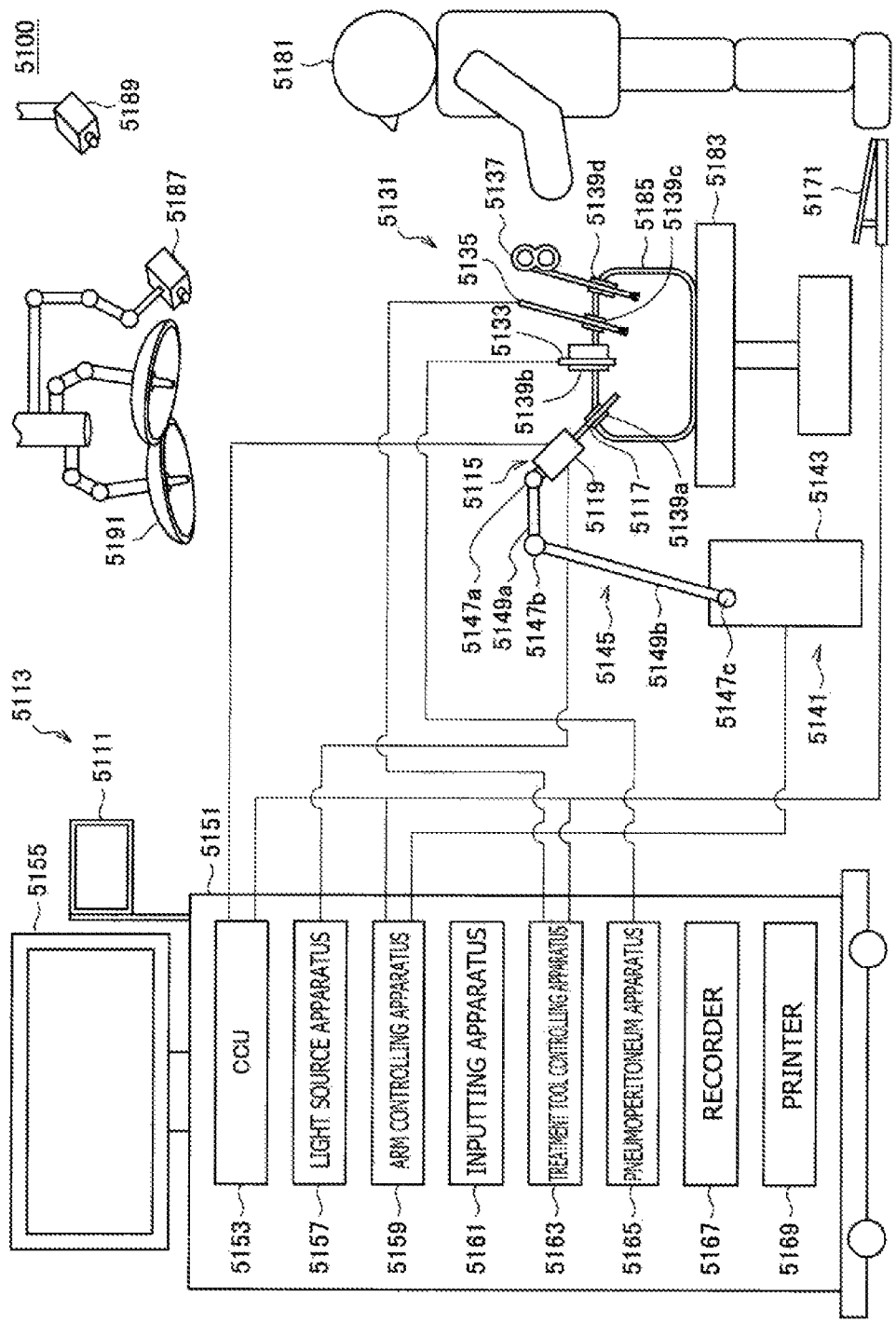
FIG. 19 is a view illustrating an example of a state of surgery to which the operating room system is applied.

FIG. 19 is a view illustrating an example of a state of surgery to which the operating room system described above is applied. The ceiling camera 5187 and the surgery field camera 5189 are provided on the ceiling of the operating room such that it can image the hands of a surgeon (medical doctor) 5181 who performs treatment for an affected area of a patient 5185 on the patient bed 5183 and the entire operating room. The ceiling camera 5187 and the surgery field camera 5189 may include a magnification adjustment function, a focal distance adjustment function, an imaging direction adjustment function and so forth. The illumination 5191 is provided on the ceiling of the operating room and irradiates at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the operating room controlling apparatus 5109 (not depicted in FIG. 19) as depicted in FIG. 17. The centralized operation panel 5111 is provided in the operating room, and the user can suitably operate the apparatus existing in the operating room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139*a* to 5139*d* are used to puncture the abdominal wall. Then, a lens barrel 5117 of the endoscope 5115 and the other surgical tools 5131 are inserted into body cavity of the patient 5185 through the trocars 5139*a* to 5139*d*. In the example depicted, as the other surgical tools 5131, a pneumoperitoneum tube 5133, an energy device 5135 and forceps 5137 are inserted into body cavity of the patient 5185. Further, the energy device 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, tweezers or a retractor may be used.

An image of a surgical region in a body cavity of the patient 5185 picked up by the endoscope 5115 is displayed on a display apparatus 5155. The surgeon 5181 would use the energy device 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy device 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147*a*, 5147*b* and 5147*c* and links 5149*a* and 5149*b* and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body cavity of the patient 5185, and a camera head 5119 connected to a proximal end of the lens barrel 5117. In the example depicted, the endoscope 5115 is depicted as a rigid endoscope having the lens barrel 5117 of the hard type. However, the endoscope 5115 may otherwise be configured as a flexible endoscope having the lens barrel 5117 of the flexible type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body cavity of the patient 5185 through the objective lens. It is to be noted that the endoscope 5115 may be a forward-viewing endoscope or may be an oblique-viewing endoscope or a side-viewing endoscope.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCC 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (CPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 17 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolution's and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy device 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy device 5135 for cautery or incision of a tissue, sealing of a blood vessel or the like. A pneumoperitoneum apparatus 5165 feeds gas into a body cavity of the patient 5185 through the pneumoperitoneum tube 5133 to inflate the body cavity in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion. 5147b. In FIG. 19, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body cavity of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the operating room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue, narrow band light observation (narrow band imaging) of imaging a predetermined tissue such as a blood vessel of a superficial portion of the mucous membrane or the like in a high contrast is performed by applying light of a narrower wavelength band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 20:
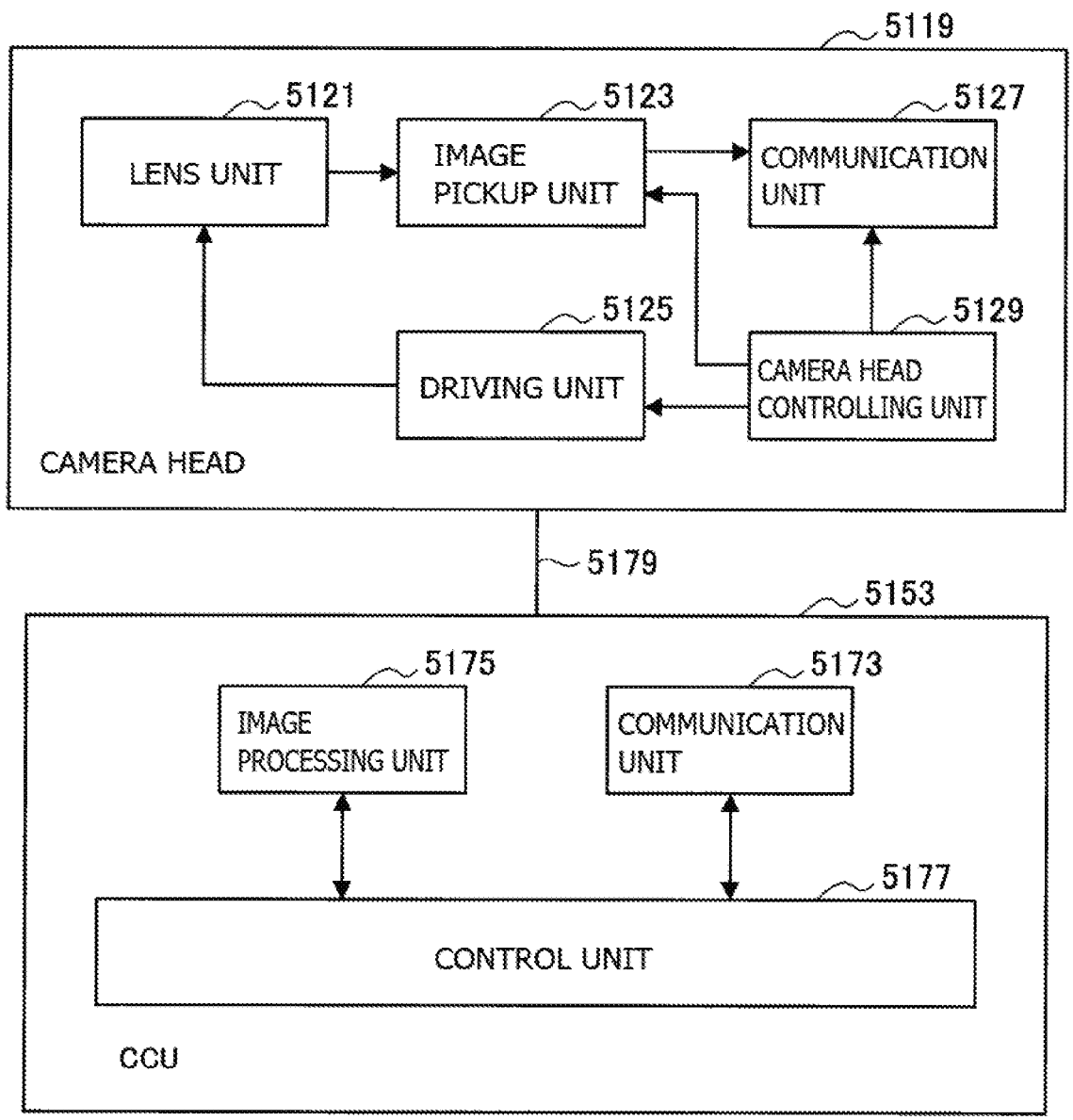
FIG. 20 is a block diagram depicting an example of a functional configuration of a camera head and a camera control unit (CCU) depicted in FIG. 19.

Functions of the camera head 5119 of the endoscope 5115 and the CCU 5153 are described in more detail with reference to FIG. 20. FIG. 20 is a block diagram depicting an example of a functional configuration of the camera head 5119 and the CCU 5153 depicted in FIG. 19.

Referring to FIG. 20, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at, a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as PAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AF) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a unction for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AR, AF and AWB.

The image processing unit 5175 includes a processor such as a CPU or a CPU, and when the processor operates in accordance with a predetermined program, the image processes and the detection process described above can be performed. It is to be noted that, where the image processing unit 5175 includes a plurality of CPUs, the image processing unit 5175 suitably divides information relating to an image signal such that image processes are performed in parallel by the plurality of CPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AF function, an AF function and an AWB, function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy device 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the operating room. Therefore, such a situation that movement of medical staff in the operating room is disturbed by the transmission cable 5179 can be eliminated.

An example of the operating room system 5100 to which the technology according to an embodiment or the present disclosure can be applied has been described above. It is to be noted here that, although a case in which the medical system to which the operating room system 5100 is applied is the endoscopic surgery system 5113 has been described as an example, the configuration of the operating room system 5100 is not limited to that of the example described above. For example, the operating room system 5100 may be applied to a soft endoscopic system for inspection or a microscopic surgery system in place of the endoscopic surgery system 5113.

From among the configurations described above, the technology according to the present disclosure can be favorably applied to a tone adjustment performed on an image of a surgical region in a body cavity of a patient imaged by the endoscope. Specifically, it is possible to obtain an image of an optimal tone for each diagnostic region (such as a digestive organ and a circulatory organ) by setting an optimal parameter according to the characteristics of the diagnostic region, and thus to improve the accuracy in observation.

Further, the technology according to the present disclosure is used to set a tone desired by a user according to a difference in characteristics depending on the manufacturer or the model of an endoscope.

The tone control described above may be performed by the user performing a manual operation, or may be automatically performed.

Note that the present technology may also take the following configurations.

(1) A video signal processing apparatus, including:
a first processing circuit section that includes a tone controller that imparts tone curve characteristics for tone adjustment to an input video signal having linear characteristics; and
a second processing circuit section that includes a first curve characteristics imparting section that imparts, to the video signal processed by the first processing circuit section, first curve characteristics for output, and generates a first output video signal.

(2) The video signal processing apparatus according to (1), in which
the second processing circuit section further includes a second curve characteristics imparting section that imparts, to the video signal processed by the first processing circuit section, second curve characteristics for output, and generates a second output video signal.

(3) The video signal processing apparatus according to (2), in which
the first curve characteristics for output are one of curve characteristics for optical-electro transfer function (OETF) conversion and curve characteristics for display gamma processing, and
the second curve characteristics for output are the other curve characteristics.

(4) The video signal processing apparatus according to any one of (1) to (3), in which
the tone controller generates the tone curve characteristics for tone adjustment using setting information.

(5) The video signal processing apparatus according to (4), in which
the setting information includes a parameter that defines a center of a range of a level of an input signal to which the tone curve characteristics are imparted.

(6) The video signal processing apparatus according to (4), in which
the setting information includes a parameter that defines a range of a level of an input signal to which the tone curve characteristics are imparted.

(7) The video signal processing apparatus according to (4), in which
the setting information includes a parameter that defines a curved shape of the tone curve characteristics.

(8) The video signal processing apparatus according to (4), in which
the setting information includes a parameter that defines an amount of variation in a level of an output signal at a center of a range of a level of an input signal to which the tone curve characteristics are imparted.

(9) The video signal processing apparatus according to any one of (4) to (8), in which
the tone controller generates coefficients for respective color components using the setting information, and generates the tone curve characteristics using the coefficients for the respective color components and gain adjustment values arbitrarily given for the respective color components.

(10) The video signal processing apparatus according to any one of (4) to (8), in which
the tone controller generates a shared coefficient for a plurality of color components using the setting information, and generates the tone curve characteristics using the coefficient and gain adjustment values arbitrarily given for the respective color components.

(11) The video signal processing apparatus according to any one of (4) to (8), in which
the tone controller is capable of switching a tone control function to be performed between a first tone control function and a second tone control function, the first tone control function being used to generate coefficients for respective color components using the setting information, and to generate the tone curve characteristics using the coefficients for the respective color components and gain adjustment values arbitrarily given for the respective color components, the second tone control function being used to generate a shared coefficient for a plurality of color components using the setting information, and generates the tone curve characteristics using the coefficient and the gain adjustment values arbitrarily given for the respective color components.

(12) The video signal processing apparatus according to any one of (1) to (11), in which
the first processing circuit section further includes a correction-and-color-balance-adjustment section that performs correction and color balance adjustment with respect to a signal generated by an imaging element, and
the tone controller processes, as the input video signal, a signal output by the correction-and-color-balance-adjustment section.

(13) The video signal processing apparatus according to any one of (1) to (12), in which
the second processing circuit section includes
a matrix processor that performs at least matrix processing on the video signal to which the tone curve characteristics have been imparted, and generates color image data, and
a detail-and-knee processor that performs detail processing and knee processing on the generated color image data, and
the first curve characteristics imparting section imparts, to color image data output by the detail-and-knee processor, the curve characteristics for output.

(14) The video signal processing apparatus according to any one of (1) to (12), in which
the second processing circuit section includes
a first matrix processor that performs at least matrix processing on the video signal to which the tone curve characteristics have been imparted, and generates first color image data of a first resolution,
a first detail-and-knee processor that performs detail processing and knee processing on the first color image data,
a second matrix processor that performs matrix processing on the video signal to which the tone curve characteristics have been imparted, and generates second color image data of a second resolution, and
a second detail-and-knee processor that performs detail processing and knee processing on the generated second color image data,
the first curve characteristics imparting section imparts, to the first color image data output by the first detail-and-knee processor, the first curve characteristics for output, and
the second curve characteristics imparting section imparts, to the second color image data output by the second detail-and-knee processor, the second curve characteristics for output.

(15) The video signal processing apparatus according to any one of (1) to (14), in which
the first color image data is a high dynamic range (HDR) video, and
the second color image data is a standard dynamic range (SDR) video.

(16) An image-capturing apparatus, including:
an image-capturing section that generates an input video signal having linear characteristics;
a first processing circuit section that includes a tone controller that imparts tone curve characteristics for tone adjustment to the input video signal; and
a second processing circuit section that includes a first curve characteristics imparting section that imparts first curve characteristics for output, and generates a first output video signal.

(17) The image-capturing apparatus according to (16), in which
the second processing circuit section further includes a second curve characteristics imparting section that imparts, to the video signal processed by the first processing circuit section, second curve characteristics for output, and generates a second output video signal.

(18) The image-capturing apparatus according to (17), in which
the first curve characteristics for output are one of curve characteristics for optical-electro transfer function (OETF) conversion and curve characteristics for display gamma processing, and
the second curve characteristics for output are the other curve characteristics.

(19) The image-capturing apparatus according to any one of (16) to (18), in which
the tone controller
the tone controller generates the tone curve characteristics for tone adjustment using setting information.

(20) The image-capturing apparatus according to (19), in which
the setting information includes a parameter that defines a center of a range of a level of an input signal to which the tone curve characteristics are imparted.

(21) The image-capturing apparatus according to (19), in which
the setting information includes a parameter that defines a range of a level of an input signal to which the tone curve characteristics are imparted.

(22) The image-capturing apparatus according to (19), in which
the setting information includes a parameter that defines a curved shape of the tone curve characteristics.

(23) The image-capturing apparatus according to (19), in which
the setting information includes a parameter that defines an amount of variation in a level of an output signal at a center of a range of a level of an input signal to which the tone curve characteristics are imparted.

(24) The image-capturing apparatus according to any one of (19) to (23), in which
the tone controller generates coefficients for respective color components using the setting information, and generates the tone curve characteristics using the coefficients for the respective color components and gain adjustment values arbitrarily given for the respective color components.

(25) The image-capturing apparatus according to any one of (19) to (23), in which
the tone controller generates a shared coefficient for a plurality of color components using the setting information, and generates the tone curve characteristics using the coefficient and gain adjustment values arbitrarily given for the respective color components.

(26) The image-capturing apparatus according to any one of (19) to (23), in which
the tone controller is capable of switching a tone control function to be performed between a first tone control function and a second tone control function, the first tone control function being used to generate coefficients for respective color components using the setting information, and to generate the tone curve characteristics using the coefficients for the respective color components and gain adjustment values arbitrarily given for the respective color components, the second tone control function being used to generate a shared coefficient for a plurality of color components using the setting information, and generates the tone curve characteristics using the coefficient and the gain adjustment values arbitrarily given for the respective color components.

(27) The image-capturing apparatus according to any one of (19) to (23), in which
the first processing circuit section further includes a correction-and-color-balance-adjustment section that performs correction and color balance adjustment with respect to a signal generated by an imaging element, and
the tone controller processes, as the input video signal, a signal output by the correction-and-color-balance-adjustment section.

(28) The image-capturing apparatus according to any one of (16) to (27), in which
the second processing circuit section includes
a matrix processor that performs at least matrix processing on the video signal to which the tone curve characteristics have been imparted, and generates color image data, and
a detail-and-knee processor that performs detail processing and knee processing on the generated color image data, and
the first curve characteristics imparting section imparts, to the color image data output by the detail-and-knee processor, the curve characteristics for output.

(29) The image-capturing apparatus according to any one of (16) to (28), in which
the second processing circuit section includes
a first matrix processor that performs at least matrix processing on the video signal to which the tone curve characteristics have been imparted, and generates first color image data of a first resolution,
a first detail-and-knee processor that performs detail processing and knee processing on the first color image data,
a second matrix processor that performs at least matrix processing on the video signal to which the tone curve characteristics have been imparted, and generates second color image data of a second resolution, and
a second detail-and-knee processor that performs detail processing and knee processing on the generated second color image data,
the first curve characteristics imparting section imparts, to the first color image data output by the first detail-and-knee processor, the first curve characteristics for output, and
the second curve characteristics imparting section imparts, to the second color image data output by the second detail-and-knee processor, the second curve characteristics for output.

(30) The image-capturing apparatus according to any one of (16) to (29), in which
the first color image data is a high dynamic range (MR) video, and
the second color image data is a standard dynamic range (SDR) video.

(31) A video signal processing method, including:
imparting, by a first processing circuit section, tone curve characteristics for tone adjustment to an input video signal having linear characteristics; and
imparting, by a second processing circuit section and to the video signal processed by the first processing circuit section, first curve characteristics for output, and generates a first output video signal.

(32) The video signal processing method according to (31), in which
the second processing circuit section imparts, to the video signal processed by the first processing circuit section, second curve characteristics for output, and generates a second output video signal.

(33) The video signal processing method according to (32), in which
the first curve characteristics for output are one of curve characteristics for optical-electro transfer function (OETF) conversion and curve characteristics for display gamma processing, and
the second curve characteristics for output are the other curve characteristics.

(34) The video signal processing method according to any one of (31) to (33), in which
the first processing circuit section generates the tone curve characteristics for tone adjustment using setting information.

(35) The video signal processing method according to (34), in which
the setting information includes a parameter that defines a center of a range of a level of an input signal to which the tone curve characteristics are imparted.

(36) The video signal processing method according to (34), in which
the setting information includes a parameter that defines a range of a level of an input signal to which the tone curve characteristics are imparted.

(37) The video signal processing method according to (34), in which
the setting information includes a parameter that defines a curved shape of the tone curve characteristics.

(38) The video signal processing method according to (34), in which
the setting information includes a parameter that defines an amount of variation in a level of an output signal at a center of a range of a level of an input signal to which the tone curve characteristics are imparted.

(39) The video signal processing method according to any one of (34) to (38), in which
the first processing circuit section generates coefficients for respective color components using the setting information, and generates the tone curve characteristics using the coefficients for the respective color components and gain adjustment values arbitrarily given for the respective color components.

(40) The video signal processing method according to any one of (34) to (38), in which
the first processing circuit section generates a shared coefficient for a plurality of color components using the setting information, and generates the tone curve characteristics using the coefficient and gain adjustment values arbitrarily given for the respective color components.

(41) The video signal processing method according to any one of (34) to (38), in which
the first processing circuit section is capable of switching a tone control function to be performed between a first tone control function and a second tone control function, the first tone control function being used to generate coefficients for respective color components using the setting information, and to generate the tone curve characteristics using the coefficients for the respective color components and gain adjustment values arbitrarily given for the respective color components, the second tone control function being used to generate a shared coefficient for a plurality of color components using the setting information, and generates the tone curve characteristics using the coefficient and the gain adjustment values arbitrarily given for the respective color components.

(42) The video signal processing method according to any one of (31) to (41), in which
the first processing circuit section performs correction and color balance adjustment with respect to a signal generated by an imaging element, and processes, as the input video signal, a signal obtained as a result of the correction and the color balance adjustment.

(43) The video signal processing method according to any one of (31) to (42), in which
the second processing circuit section
performs at least matrix processing on the video signal to which the tone curve characteristics have been imparted, and generates color image data,
performs detail processing and knee processing on the generated color image data, and
imparts, to color image data obtained as a result of the detail processing and the knee processing, the curve characteristics for output.

(44) the video signal processing apparatus according to any one of (31) to (42), in which
the second processing circuit section
performs at least matrix processing on the video signal to which the tone curve characteristics have been imparted, and generates first color image data of a first resolution, and
performs detail processing and knee processing on the first color image data, and then imparts, to the first color image data, the first curve characteristics for output, and
the second processing circuit section
performs matrix processing on the video signal to which the tone curve characteristics have been imparted, and generates second color image data of a second resolution, and
performs detail processing and knee processing on the generated second color image data, and then imparts, to the second color image data, the second curve characteristics for output.

(45) The video signal processing method according to any one of (31) to (44), in which
the first color image data is a high dynamic range (MR) video, and
the second color image data is a standard dynamic range (SDR) video.

REFERENCE SIGNS LIST

A HDR-process section
B SDR-process section
1 image-capturing apparatus
11 optical system
12 image-capturing section
20 video signal processor
21 preprocessor
22 RGB gain adjuster
23 tone controller
24 matrix processor
25 detail-and-knee processor
26 curve characteristics imparting section
28 CPU

The invention claimed is:

1. A video signal processing apparatus, comprising:
a first processing circuit configured to generate tone curve characteristics for tone adjustment based on setting information preset by a user and impart the generated tone curve characteristics for tone adjustment to an input video signal having linear characteristics; and
a second processing circuit configured to impart, to the video signal processed by the first processing circuit, at least one of
first curve characteristics for output, and generate a first output video signal, wherein the first curve characteristics for output are curve characteristics for optical-electro transfer function (OETF) conversion, and
second curve characteristics for output, and generate a second output video signal that is different from the first output video signal, wherein the second curve characteristics for output are curve characteristics for display gamma processing.

2. The video signal processing apparatus according to claim 1, wherein the setting information used by the first processing circuit includes a parameter that defines a center of a range of a level of an input signal to which the tone curve characteristics are imparted.

3. The video signal processing apparatus according to claim 1, wherein the setting information used by the first processing circuit includes a parameter that defines a range of a level of an input signal to which the tone curve characteristics are imparted.

4. The video signal processing apparatus according to claim 1, wherein the setting information used by the first processing circuit includes a parameter that defines a curved shape of the tone curve characteristics.

5. The video signal processing apparatus according to claim 1, wherein the setting information used by the first processing circuit includes a parameter that defines an amount of variation in a level of an output signal at a center of a range of a level of an input signal to which the tone curve characteristics are imparted.

6. The video signal processing apparatus according to claim 1, wherein the first processing circuit is further configured to generate coefficients for respective color components using the setting information, and generate the tone curve characteristics using the coefficients for the respective color components and gain adjustment values arbitrarily given for the respective color components.

7. The video signal processing apparatus according to claim 1, wherein the first processing circuit is further configured to generate a shared coefficient for a plurality of color components using the setting information, and generate the tone curve characteristics using the coefficient and gain adjustment values arbitrarily given for the respective color components.

8. The video signal processing apparatus according to claim 1, wherein
the first processing circuit is further configured to switch a tone control function to be performed between a first tone control function and a second tone control function, the first tone control function being used to generate coefficients for respective color components using the setting information, and to generate the tone curve characteristics using the coefficients for the respective color components and gain adjustment values arbitrarily given for the respective color components, the second tone control function being used to generate a shared coefficient for a plurality of color components using the setting information, and generate the tone curve characteristics using the coefficient and the gain adjustment values arbitrarily given for the respective color components.

9. The video signal processing apparatus according to claim 1, wherein
the first processing circuit is further configured to perform correction and color balance adjustment with respect to a signal generated by an imaging element, and
the first processing circuit is further configured to process, as the input video signal, a signal on which the correction and color balance adjustment has been performed.

10. The video signal processing apparatus according to claim 1, wherein
the second processing circuit further includes
a matrix processing circuit configured to perform at least matrix processing on the video signal to which the tone curve characteristics have been imparted, and generate color image data, and
a detail-and-knee processing circuit configured to perform detail processing and knee processing on the generated color image data, and
the second processing circuit is further configured to impart, to color image data output by the detail-and-knee processing circuit, the curve characteristics for output.

11. The video signal processing apparatus according to claim 1, wherein
the second processing circuit further includes
a first matrix processing circuit configured to perform at least matrix processing on the video signal to which the tone curve characteristics have been imparted, and generate first color image data of a first resolution,
a first detail-and-knee processing circuit configured to perform detail processing and knee processing on the first color image data,
a second matrix processing circuit configured to perform matrix processing on the video signal to which the tone curve characteristics have been imparted, and generate second color image data of a second resolution, and
a second detail-and-knee processing circuit configured to perform detail processing and knee processing on the generated second color image data,
the second processing circuit is further configured to impart, to the first color image data output by the first detail-and-knee processing circuit, the first curve characteristics for output, and
the second processing circuit is further configured to impart, to the second color image data output by the second detail-and-knee processing circuit, the second curve characteristics for output.

12. The video signal processing apparatus according to claim 11, wherein
the first color image data generated by the first matrix processing circuit is a high dynamic range (HDR) video, and
the second color image data generated by the second matrix processing circuit is a standard dynamic range (SDR) video.

13. The video signal processing apparatus of claim 1, wherein the second processing circuit further includes:
a first matrix processing circuit configured to perform at least matrix processing on the video signal to which the tone curve characteristics have been imparted, and generate first color image data of a first resolution, and
a second matrix processing circuit configured to perform matrix processing on the video signal to which the tone curve characteristics have been imparted, and generate second color image data of a second resolution different from the first resolution.

14. The video signal processing apparatus of claim 1, wherein the first processing circuit is further configured to perform pre-processing, including defect correction and lens aberration correction, on a signal generated by an imaging element.

15. The video signal processing apparatus of claim 1, wherein the second processing circuit is further configured to both impart the first curve characteristics for output to generate the first output video signal, and impart the second curve characteristics for output to generate the second video signal.

16. An image-capturing apparatus, comprising:
an image-capturing section that generates an input video signal having linear characteristics;
a first processing circuit configured to generate tone curve characteristics for tone adjustment based on setting information preset by a user and impart the generated tone curve characteristics for tone adjustment to the input video signal; and
a second processing circuit configured to impart, to the video signal processing by the first processing circuit, at least one of
first curve characteristics for output, and generate a first output video signal, wherein the first curve characteristics for output are curve characteristics for optical-electro transfer function (OETF) conversion, and
second curve characteristics for output, and generate a second output video signal that is different from the first output video signal, wherein the second curve characteristics for output are curve characteristics for display gamma processing.

17. A video signal processing method, comprising:
generating tone curve characteristics for tone adjustment based on setting information preset by a user;
imparting, by a first processing circuit, the generated tone curve characteristics for tone adjustment to an input video signal having linear characteristics; and
imparting, by a second processing circuit to the video signal processed by the first processing circuit, at least one of
first curve characteristics for output, and generate a first output video signal, wherein the first curve characteristics for output are curve characteristics for optical-electro transfer function (OETF) conversion; and
second curve characteristics for output, and generate a second output video signal that is different from the first output video signal, wherein the second curve characteristics for output are curve characteristics for display gamma processing.

* * * * *